US00RE46865E

(19) United States
(12) Reissued Patent
Schifone

(10) Patent Number: US RE46,865 E
(45) Date of Reissued Patent: May 22, 2018

(54) METHOD AND PLATFORM FOR PROVIDING AN INTERACTIVE INTERNET COMPUTER-DRIVEN/IP BASED STREAMING VIDEO/AUDIO APPARATUS

(71) Applicant: Cinsay, Inc., Dallas, TX (US)

(72) Inventor: Eric Schifone, Hollis, NH (US)

(73) Assignee: Cinsay, Inc., Dallas, TX (US)

(21) Appl. No.: 14/966,780

(22) Filed: Dec. 11, 2015

Related U.S. Patent Documents

Reissue of:
(64) Patent No.: 7,840,415
Issued: Nov. 23, 2010
Appl. No.: 11/881,700
Filed: Jul. 30, 2007

(51) Int. Cl.
*G06Q 99/00* (2006.01)
*G06F 17/30* (2006.01)
*G06Q 10/10* (2012.01)

(52) U.S. Cl.
CPC ... *G06F 17/30017* (2013.01); *G06Q 10/1053* (2013.01)

(58) Field of Classification Search
CPC .... G06Q 10/1053; G06Q 99/00; G06F 17/30; G06F 19/00
USPC ..... 705/1.1, 321
See application file for complete search history.

(56) References Cited

U.S. PATENT DOCUMENTS 5,206,934 A 4/1993 Naef, III
6,608,636 B1 8/2003 Roseman
6,789,120 B1 * 9/2004 Lee ..... H04L 29/06027 370/352
7,730,132 B2 6/2010 Ludwig et al.
7,840,415 B2 11/2010 Schifone
7,987,098 B2 7/2011 Schifone
2002/0046074 A1 * 4/2002 Barton ..... 705/8
2002/0055870 A1 * 5/2002 Thomas ..... 705/10
2002/0056109 A1 5/2002 Tomsen
2002/0169631 A1 * 11/2002 Lewis ..... 705/1
2003/0014294 A1 * 1/2003 Yoneyama ..... G06Q 10/063112 705/7.14
2003/0071852 A1 * 4/2003 Stimac ..... G06Q 10/10 715/810
2003/0085929 A1 * 5/2003 Huber et al. ..... 345/810
2004/0139156 A1 * 7/2004 Matthews ..... G06Q 30/01 709/204
2004/0186743 A1 * 9/2004 Cordero, Jr. ..... G09B 7/00 705/321
2005/0235033 A1 * 10/2005 Doherty ..... H04L 12/1813 709/204
2005/0283717 A1 * 12/2005 Giraldo ..... G06Q 10/00 715/202

(Continued)

OTHER PUBLICATIONS

Frank M. Kappe, "Aspects of a Modern Multi-Media Information System", Institute for Foundations of Information Processing and Computer Supported Media (IICM) Graz University of Technology, 1991.

(Continued)

*Primary Examiner* — Minh Dieu Nguyen

(57) ABSTRACT

A method and platform for providing an interactive interne computer-driven IP based streaming video/audio webcam meeting and interview apparatus, intended for the process of job searching, employer recruiting and the selection of candidates both nationally and internationally, for national and international employment opportunities.

23 Claims, 16 Drawing Sheets

(56) References Cited

U.S. PATENT DOCUMENTS

| | | | | |
|---|---|---|---|---|
| 2006/0026069 | A1* | 2/2006 | Mazurkiewicz et al. | G06Q 10/06 705/14.42 |
| 2006/0064342 | A1* | 3/2006 | Frengut | G06Q 10/00 705/7.32 |
| 2006/0106780 | A1* | 5/2006 | Dagan | 707/3 |
| 2006/0132607 | A1* | 6/2006 | Kimber | H04L 12/1822 348/207.1 |
| 2006/0155636 | A1* | 7/2006 | Hermann et al. | 705/37 |
| 2006/0229896 | A1* | 10/2006 | Rosen et al. | 705/1 |
| 2007/0150370 | A1 | 6/2007 | Staib et al. | |
| 2008/0055398 | A1* | 3/2008 | Ryckman | 348/14.1 |
| 2008/0059290 | A1* | 3/2008 | McFaul | 705/11 |
| 2008/0074487 | A1* | 3/2008 | Ryckman | 348/14.1 |
| 2008/0262859 | A1* | 10/2008 | Ting | G06Q 10/06 705/1.1 |
| 2009/0049095 | A1* | 2/2009 | Simon et al. | 707/104.1 |
| 2010/0017299 | A1 | 1/2010 | Pirani | |

OTHER PUBLICATIONS

Kevin Jeffay, "System Design for Workstation-Based Conferencing with Digital Audio and Video", IEEE Conference on Communications Software: Communications for Distributed Application and Systems, Apr. 18-19, 1991.

Office Action for U.S. Appl. No. 14/633,986, dated Jun. 5, 2017, 25 pages.

Supplementary Partial European Search Report for European Application No. 15760646.8, dated Jul. 21, 2017, 7 pages.

Office Action for U.S. Appl. No. 14/644,603, dated Jan. 31, 2017, 16 pages.

* cited by examiner

FIG. 6

As A candidate Viewing an Employer's Personal/Professional Profile 60 61 62 63 64 65 66 67 68

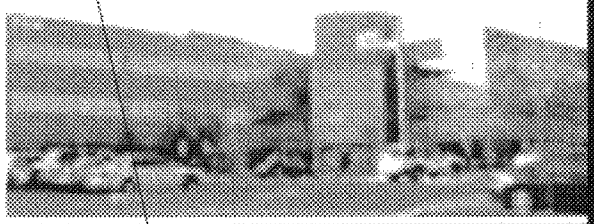

The ABC. Corp

| | |
|---|---|
| Location | Nashua, NH |
| Currently Hiring | Yes |
| Positions Available | 10 |
| Contact Person | Jane Smith |

ABC Corp is located in Nashua, NH. We have been in business for over 20 years within the same location. Our focus is to deliver the latest telecommunications products to Internet service providers. We pride ourselves on not only our state of the art technology, but also our top-notch working environment. We are a production/results driven company with no micromanagement. We provide all employees with full benefits, 401K, stock options, etc.. Our facilities provide a cafeteria, gym, outside oasis great for lunch and individual offices for each of our employees. We are currently looking for self-motivated, team contributors, that are interested in pushing their skills and abilities to the limits.

| Date Posted | Title | Description & Requirements |
|---|---|---|
| 01/01/2007 | Software Engineer | Searching for a Software Engineer with extensive C++ applications level experience on a Unix Platform. Must have following experience: XP methodology, OOD and Multithreaded C++ experience. |
| 01/01/2007 | Hardware Engineer | Searching for a Hardware Engineer with Extensive knowledge of ASIC Design Verification. Knowledgeable of: Vera, Power PC, VXworks, Scheduling, debugging, bugzilla, etc. |

FIG. 7

As A candidate Viewing an Employer's Personal/Professional Profile

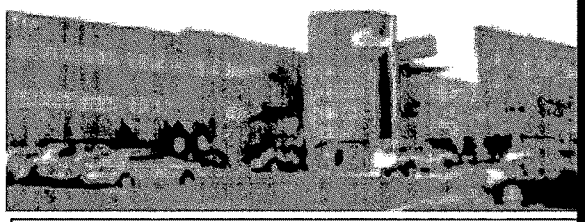

The ABC. Corp

| | |
|---|---|
| Location | Nashua, NH |
| Currently Hiring | Yes |
| Positions Available | 10 |
| Contact Person | Jane Smith |

To: Candidate 1111

Subject

Body

Send Email | Save Email

| Date Posted | Title | Description & Requirements |
|---|---|---|
| 01/01/2007 | Software Engineer | Searching for a Software Engineer with extensive C++ applications level experience on a Unix Platform. Must have following experience: XP methodology, OOD and Multithreaded C++ experience. |
| 01/01/2007 | Hardware Engineer | Searching for a Hardware Engineer with Extensive knowledge of ASIC Design Verification. Knowledgeable of: Vera, Power PC, VXworks, Scheduling, debugging, bugzilla, etc. |

Main Login Screen Employment Flow Page

METHOD AND PLATFORM FOR PROVIDING AN INTERACTIVE INTERNET COMPUTER-DRIVEN/IP BASED STREAMING VIDEO/AUDIO APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

This invention consists of a method and platform for providing an interactive internet computer-driven IP based streaming video/audio webcam meeting and interview apparatus, intended for the process of job search, employer recruiting and selection of candidates for employment.

Specifically this invention will enable employers to "Enhance Conventional Recruiting Methods by Embracing New Computer-Driven Video Conferencing Technology" all through a convenient web site which will allow both Employers and Candidates a convenient and unique method of employee recruitment and employment search. This invention truly enhances conventional online recruiting methods by allowing Candidates and Employers to meet through video conferencing in real time from remote locations. Additionally, employers will be able to view personalized candidate profiles with their written and video resumes, personal pictures, contact information and any additional personal/professional information intended to attract employers. Through this invention, the employer may schedule and perform pre-hire interviews (pre-hire conversations) with candidates internationally or conference with current employees and or other companies registered with this online computer driven apparatus via a webcam or any IP based streaming media video input/output device that has the ability to connect to the World Wide Web or the "Web" for employment purposes.

Further the objective of this invention is to provide a method and apparatus of establishing intimate relationships between employers seeking candidates and candidates seeking employment opportunities. This invention will allow employers to "Virtually" meet a candidate and vice-versa without actually having the candidate present. This will further reduce global pollution, reduce wasted company expenditures and reduce wasted time by eliminating the need to physically travel to interview or meet for the purpose of employment.

2. Description of the Related Prior Art

Many resources are presently available to assist businesses in finding candidates to fill their available employment positions. Presently there are a few major methods of finding candidates: first is direct advertisement through newspapers, company websites and job bulletin boards. Within these advertisements a typical employer's advertisement may include, a focused skill-set, a brief description, a contact person, phone number or fax number. There are many disadvantages to this recruiting method. In this recruitment model, employers may be limiting the number of candidates viewing their advertisement due to the limited market reach of the advertisement method chosen (i.e. the newspaper, company website homepages, magazines, etc.). This recruiting model may require the employer to advertise multiple times and expand its market reach with surrounding area newspapers, magazines, and multiple job bulletin boards, etc. Unfortunately the employer has little to no control over the newspaper or magazine's target audience and the employer must blindly search and filter through the candidates responding to these postings. Additionally, the Employer may incur substantially higher advertisement expenses and a loss of time posting and reposting with little to no results.

The second employment recruiting model would be indirect or assisted recruiting. This is where the employer may pay a third party company, either an internet driven recruiter or a human driven recruiting company to advertise their available employment opportunities within databases offering a much higher candidate exposure and possibly prequalified candidates. With human driven recruiting companies, an employer may incur substantially higher costs for recruiting candidates through finders fees, advertisement fees, etc. Also, there is still a risk that the employer would waste time searching through excess marginal or unqualified candidates submitted from the human driven recruiting company due to human error and misunderstandings, resulting in increased recruiting costs and a substantial loss of time.

With Internet computer-driven recruiting systems, an employer may incur a large annual fee to have access to this type of recruiting apparatus. With this model, not only does the employer incur an annual fee, it can also consume a significant amount of its Personnel Department's time. Most internet recruiting inventions offer large vast databases with many candidates, resumes and search filtering devices intended to assist and filter the searching for candidates relevant to the employer's available employment opportunities. While the online recruiting method utilizes the advantage of the internet's broad market reach it lacks the vital element of Human Interaction and the ability to obtain an intimate relationship via the internet computer-driven recruiting apparatus. In the online computer-driven recruitment model, the employer will lose substantial time through such things as; posting available job openings, screening through impersonal candidate profiles, searching through impersonal resumes, lastly scheduling and performing blind interviews resulting in both higher costs of advertisements and a substantial loss of time.

SUMMARY OF THE INVENTION

Method and platform for providing an interactive internet computer-driven IP based streaming video/webcam meeting and interview apparatus, intended for the process of job search, employer recruiting and selection of candidates for employment.

Also specifically this invention will enable employers to fully "Enhance Conventional Recruiting Methods by Embracing New Technology" all through a web site which will allow both Employers and Candidates a convenient and unique method of employee recruitment and employment search. The invention will truly enhance conventional recruiting methods by allowing candidates and employers to personally meet while at remote locations. Employers will be able to view personalized candidate profiles with their written and video resumes, personal pictures, contact information and any additional personal/professional information intended to attract employers. Through this invention the employer may perform pre-hire interviews (pre-hire conversations) with candidates or conference with current employees and other companies registered with this online computer driven apparatus via a webcam or any IP based streaming media video and audio input/output device that has the ability to connect to the or the Web.

A further object of the invention is to provide a method and apparatus designed for establishing the most intimate relationships between employers seeking candidates and candidates seeking employment opportunities. This invention will allow employers to search through candidate profiles and meet candidates without actually having the candidate present. Once the relationship has been created, the employer or the candidate may decide if they have created a successful relationship, if not, the candidate may block the employers' profile and the employer may block the candidates' profile to cease future contact. Also a candidate or employer at any time may block any profile from viewing their page, intended as a convenience so there are no profiles posted as confidential in this apparatus.

The above objectives are successfully achieved by providing a "web" based software program created with such technologies as: ASP.Net, PHP, Java, Javascript, Ajax, and more, recorded on a computer which will be launched and hosted through Managed Network Devices.

This invention will first use Domain Name servers (or DNS Server). When a candidate or employer types the uniform resource locator (URL) associated with the DNS Server into their browser bar, they will be requesting the IP address for a particular website from a DNS server. Instead of owning and maintaining any DNS servers, provider of this invention will use a "Managed DNS" service which will basically handle user IP requests through a huge network of servers, distributing the load based on which servers are available at any given time. This system cuts down on congestion, resulting in fewer slowdowns and DNS errors for users at peak access times.

Next this invention will utilize Proxy servers. The Proxy servers will sit between a user computer and the provider of the apparatus's main servers. They will then deliver cached content to users which will limit redundant requests to the provider of the apparatus's application servers. Enabling content caching at this level will cut down on congestion.

Third, the invention will utilize a database comprised of managed scalable cluster servers. The cluster stores users' uploaded media files (images, videos, resume, etc.).

Lastly, this invention's back-end will be an I/O interfacing server switch. This server switch will facilitate communication between multiple severs on multiple platforms—in this case, between all of the servers in the provider of the apparatus's infrastructure and between the provider of the apparatus's servers and the external servers that deliver content to the end user.

BRIEF DESCRIPTION OF THE DRAWINGS

FIG. 6 is an example of a display screen generated by a computer running software which illustrates the candidate's view of an employer's personal page as a part of the manual process presented in FIG. 3. It is here the candidate will be able to view the employer's personal information such as location, available jobs, a brief description about the company and an internal email to contact the employer according to the embodiment of this invention;

FIG. 7 is an example of a display screen generated by a computer running software which illustrates the candidate's view of the internal email system allowing a communication method between employers and candidates.

DETAILED DESCRIPTION OF THE PREFERRED EMBODIMENTS

Figure 1:
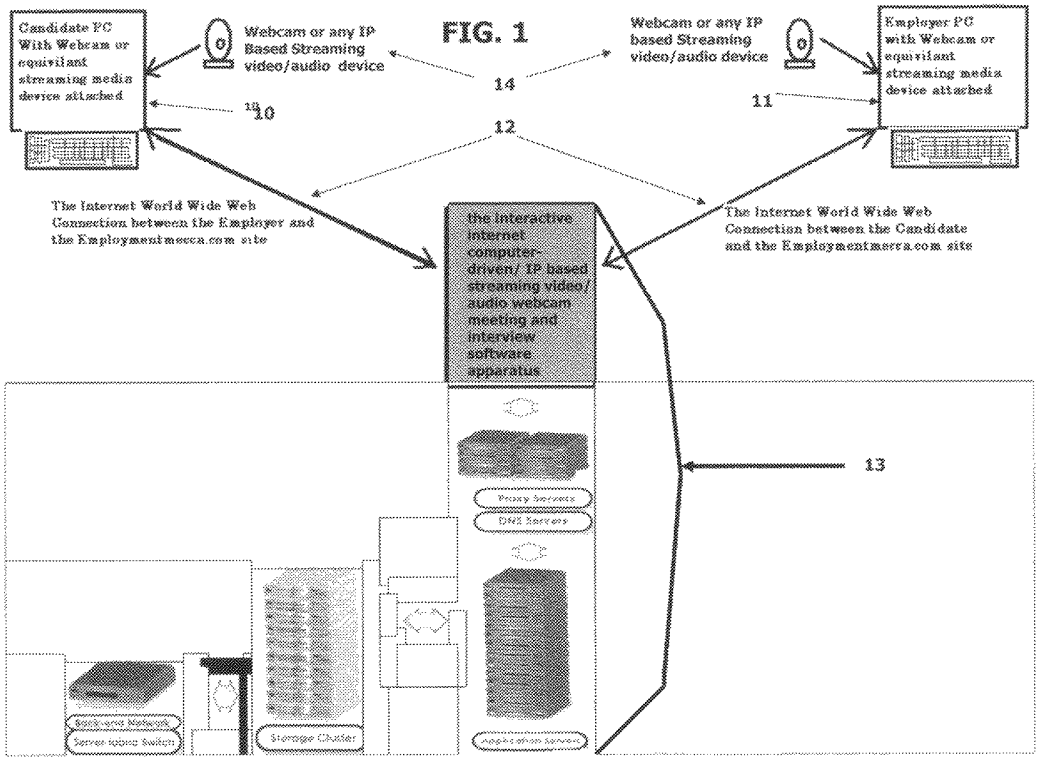
FIG. 1 is a diagrammatic illustration of a computerized infrastructure network required to accomplish the goals according to an embodiment of this invention.

An overview of an embodiment of this invention is illustrated in FIG. 1. Specifically this figure illustrates a relationship between a computer used by a person searching for a position (job seeker/candidate 10), a plurality of an employer or company 11 each having a computer or a company computer which runs and accesses computer readable software running on a remote computer and infrastructure according to the embodiment of this invention, and a remote location computer 14 having an infrastructure such as a remote site computer, which runs addition computer readable software that is accessible by both the candidate(s) and the Employer(s)/Company(s) according to this invention. The remote location computer 14 may have readable software, which is maintained by a service provider which would have contractual agreements with the employer(s) or company(ies) 11 and candidates or job seekers 10. It is essential for the employer 11, the candidate 10 and the remote location computer 14 and infrastructure to be equipped with the proper communications equipment, modems and the necessary software so they can communicate with each other via the interne 12 or (Web 12). The operations performed by a candidate or job seeker computer 10, accessing the running computer software according to the embodiment of this invention will now be described. This present invention will be written/developed, for example, in scripting languages such as; C, PHP, HTML, XHTML, Java, SQL, ASP.NET, Ajax, and languages like this.

Specifically the candidate site program that is run by the candidate's computer 10 is compatible for the use with Windows 98SE™ or better, but can be written in any language that is executable by any type of computer, and can be configured to be compatible for use with any type of operating system, software or Web browser. The Candidate site program can be accessed by any computer with an operating system which meets the minimum requirements and is properly equipped to connect and communicate via the "Web" or World Wide Web.

Figure 2:
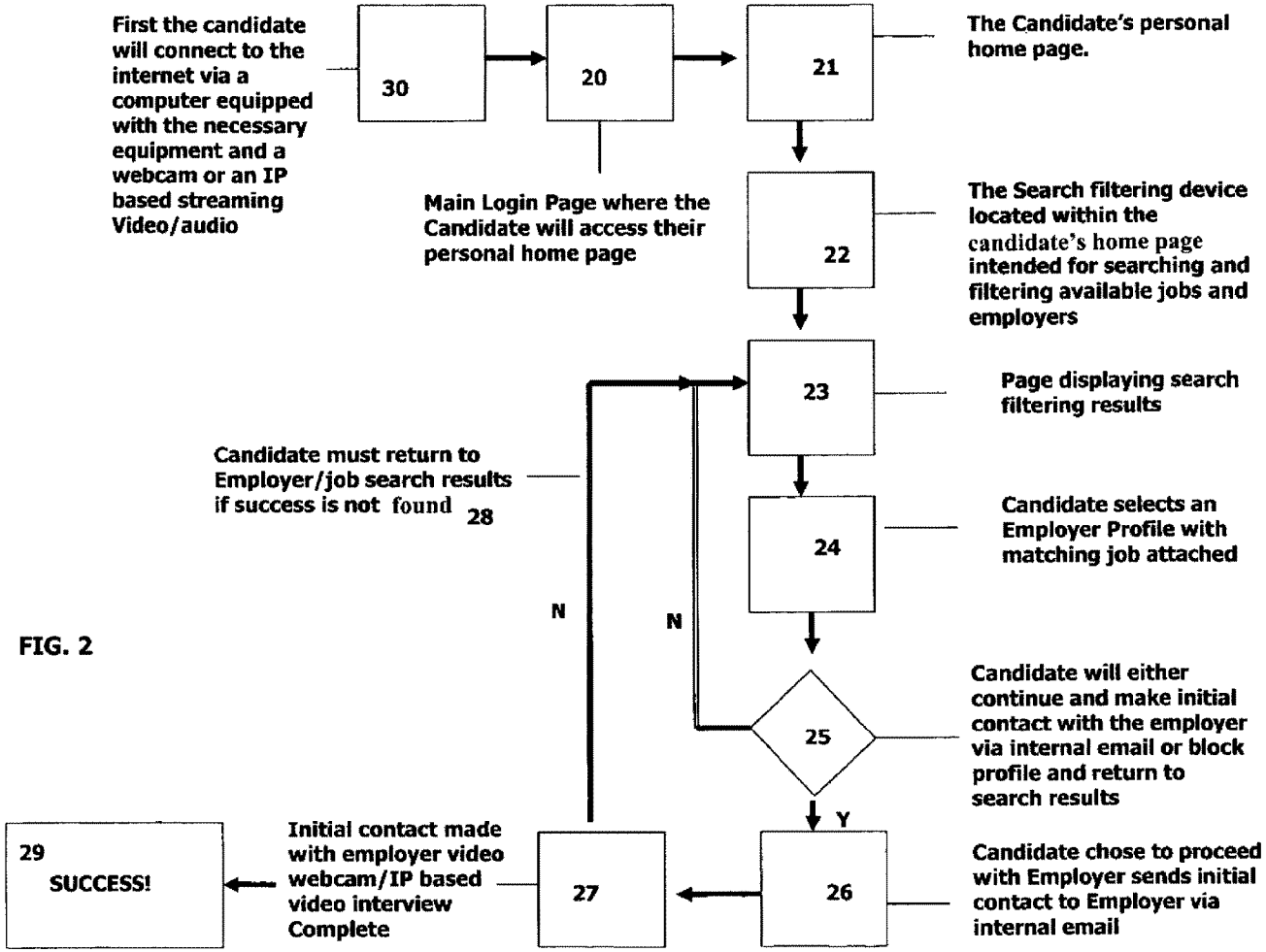
FIG. 2 is a flow chart showing the method in which a candidate (end user) will successfully establish relationships with Employers according to the embodiment of this invention.

FIG. 2 is a flowchart illustrating an example of the operations performed by a candidate intended to create a successful relationship with an employer according to the embodiment of this invention. The candidate 10 may use any personal computer with the ability to connect to the "Web". By connecting the candidate's computer to the web 30, the candidate 10 may access the home page 20 or log-in page of the apparatus. The home page 20 allows the candidate 10 to access this invention, by remotely running computer software according to the embodiment of the invention. The candidate 10 may either log in or create a new account in the home page 20.

Once the candidate 10 creates a new secure personal account 21, the candidate will be prompted to enter personal and professional data required in order to establish a personal account 21 within the embodiment of this invention. Within the personal account 21, the candidate will have access to the Employer profile/Job filtering device 22. Within the employer profile/job searching and filtering device 22, the candidate may enter particular data within pre-established data fields which will assist the candidate by systematically reducing employer profile's with attached jobs until the candidate search is final with the end results 23 according to the embodiment of this invention. Once the end results are met, the candidate will be able to view the search results 23 derived from the candidate's entered search criteria.

With the candidate viewing the search results 23, the candidate will be able to individually select any "employer profile" 24, which will fully display the employer's personal profile page, presenting that employer's available jobs, contact information, pictures, a brief description and a direct email account attached to the selected employer's profile as part of an internal email system 26 allowing the candidate to make initial contact with the employer according to the embodiment of this invention. The candidate will have a decision making point 25 after reviewing the employer's personal profile with attached jobs 24 to either send an email to the employer through the internal email system 26 or returning to the employer profile/job search results 23.

The candidate decides to proceed to pursue a relationship with the selected employer/employer profile 24 and sends an email from the candidate's profile to the employer's profile 26. Once the candidate sends a contact email, the employer has the discretion to either send a returned email or a request to perform a video, IP based streaming media/webcam interview 27. If the employer decides to send a request for a webcam/streaming video and audio web interview 27, the candidate is expected to either dismiss the interview or accept the interview. In the event that the employer successfully conducts a IP based web interview, the candidate and the employer may either find success 29 and move forward to hiring the candidate 10 or the candidate must take the return path 28 returning back to the employer profile search results 23 to start over again.

Figure 3:
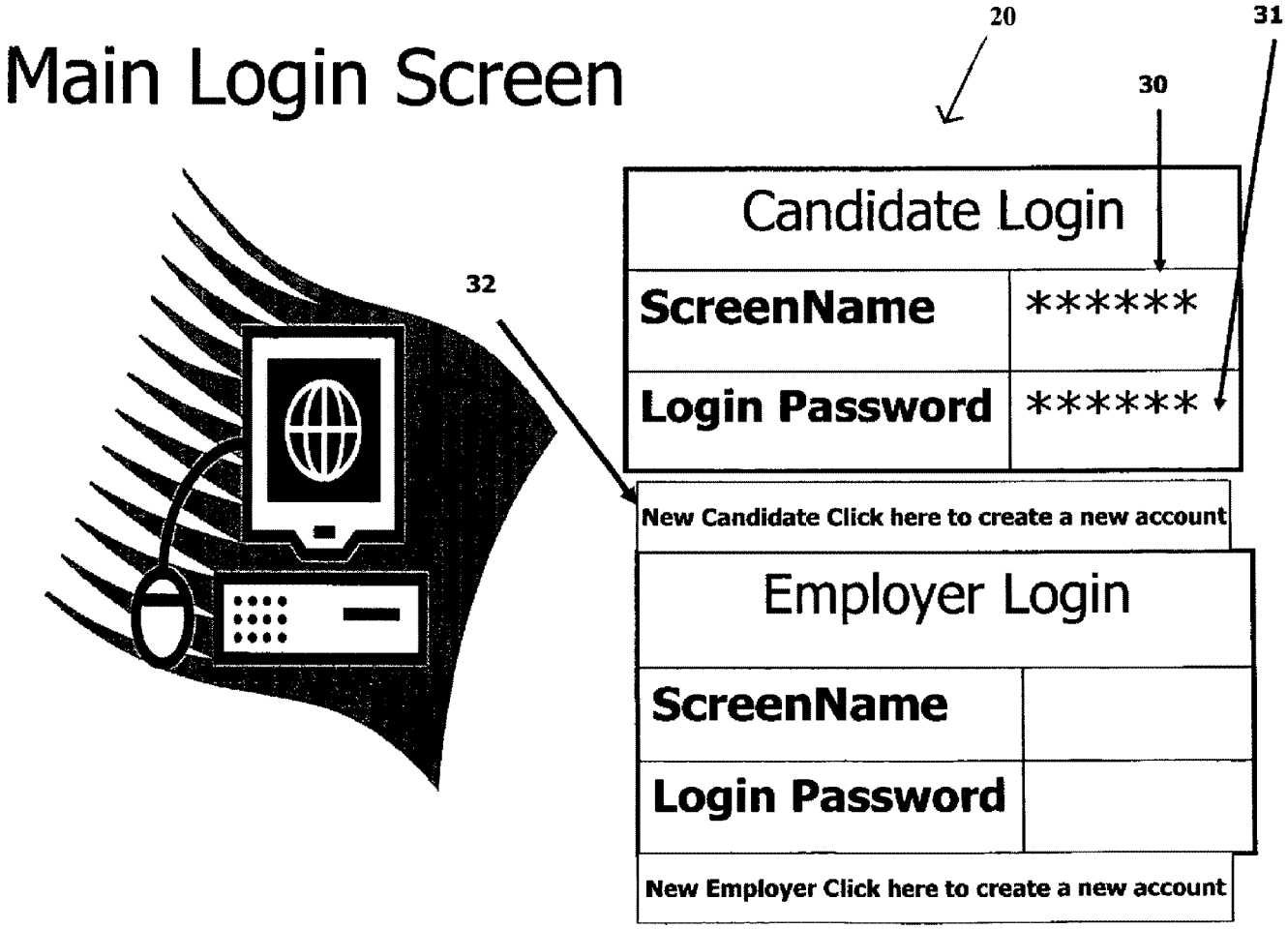
FIG. 3 is an example of a display screen generated by a computer running software which illustrates the initial "log-in" step for a candidate to use the apparatus according to the embodiment of this invention.

FIG. 3 is an example illustration of the main login-in page 20 where either a candidate 10 or an employer/company 11 may sign in. If this is the first time that the candidate 10 or employer/company 11 accesses the invention, they will be required to create a new account 32 which will bring the candidate 10 or employer/company 11 to enter a new blank profile with pre-generated fields where the candidate 10 may enter their own personal information which will be searchable by the counter-user (i.e. the candidate is able to search for companies and companies are able to search for candidates or other companies register and are permissible to be using this invention). Once an account is created, the candidate 10 will be able to enter a self generated username 30 and enter a self generated password 31 which will allow the candidate 10 to access this invention remotely from any computer connected and able to communicate with the "Web" according to the embodiment of this invention.

Figure 4:
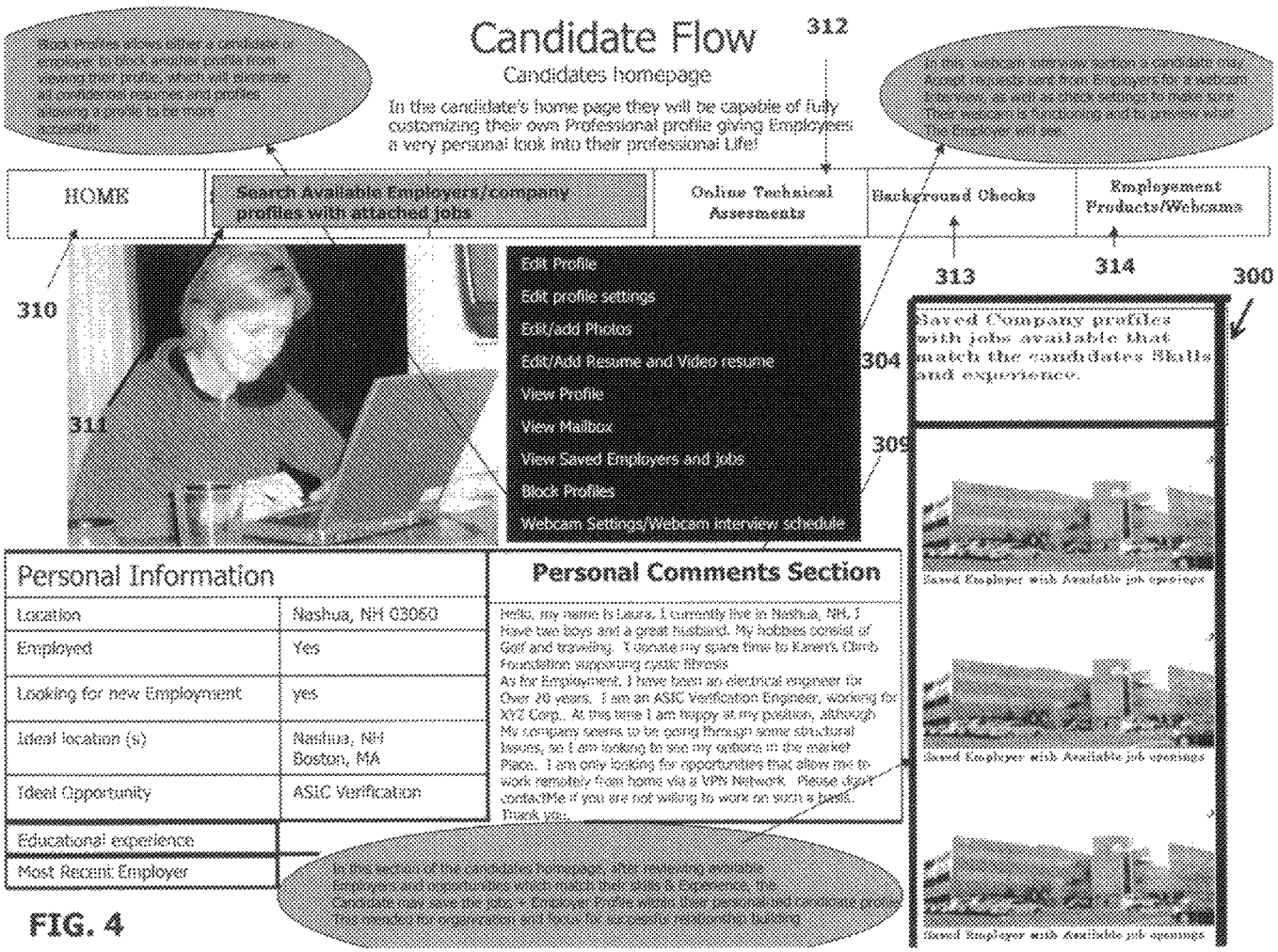
FIG. 4 is an example of a display screen generated by a computer running software which illustrates the candidate's personal home page where the candidate will be able to securely log-in to access their own self generated account which will be stored within the infrastructure of this invention. It is here where the candidate will be able to upload and save their personal/professional data, block employer/company profiles, search for employers/company profiles with attached jobs, add text resumes, video resumes and any other pertinent information within the intended to attract employers as a part of the manual process presented in FIG. 3 according to the embodiment of this invention.

FIG. 4 is an example illustration of the candidates personal "Home Page." From this section of this invention, the candidate will be able to enter all necessary personal data (i.e. direct contact information, location/address, resume, video resume, personal comments, etc.) which will be openly searchable by "employer profiles" registered to use this invention. From the candidate's "home page" the candidate will be able to edit their profile, updating their name, screen name, address, contact information, educational information, level of experience, most recent employer, etc. according to the embodiment of this invention. Second candidate will be able to edit their profile settings from their "home page." The candidate will select the edit profile tab located within the candidate's "home page" which will allow the candidate to add and change features to their "home page" such as security settings, change passwords and usernames, change the profile to private making the profile inactive if the candidate is not looking to be contacted for employment opportunities at any time, etc. all according to the embodiment of this invention. Third, the candidate will have a tab located on the candidate's "home page" for add or edit both a word resume and a video resume 304. The candidate will click on this tab which will open a new window or section within the candidate's "home page" which will give the candidate an option to upload a word resume and a video resume into their personal profile which will be saved and maintained on a remote computer and infrastructure according to the embodiment of this invention.

Fourth the candidate will be able to view their personal profile/"home page" by clicking on a View Profile tab. This view will enable the candidate to view their own profile in the same format as the employer/company profile will view it. This way the candidate will be capable of visually noticing any errors or things they would like to change, according to the embodiment of this invention.

Fifth, the candidate will have a mailbox where the candidate will be able to send and receive emails directly to and from other active Employer/company profiles located within this invention. The candidate will click on the tab located in their "home page" which will open a new mailbox window allowing the candidate to save emails, view sent emails and received emails, etc. according to the embodiment of this invention.

Sixth, the candidate will be able to view all saved employers/company profiles 300 by selecting the view saved employers/Companies tab. By selecting this tab it will open a new window showing every employer/company that has been viewed and saved, according to the embodiment of this invention.

Seventh, the candidate will be able to block any employer/company profiles as necessary by selecting the Block Profiles tab. By selecting the Block Profiles tab 308, the candidate will never have to create a confidential profile, limiting their exposure. They will simply select the Block Profiles tab located within the candidate's "home page", which will allow the candidate to perform an employer/company profile search. Once the candidate selects the intended profile, the candidate will be prompted to block the selected profile which will enable the selected employer/candidate profile from being able to view the candidate's personal profile according to the embodiment of this invention.

Eighth, the candidate will be able to view their webcam Interview schedule and requests by selecting the "webcam Settings/Webcam interview Schedule" tab 309. When the candidate clicks this tab, a new window will open up within the candidate's "home page" enabling the candidate to view their personal "Web video Interview Scheduler" FIG. 9. Within the Scheduler, the candidate may view and accept/deny any web streaming video/audio requests sent to the candidate from an employer/company profile, view how they will look from the employer/company profile, delay the web video/audio start time, etc. according to the embodiment of this invention.

Ninth, the candidate will be able to search available employer/company profiles with attached jobs, by clicking a "Search Available employers/companies with attached Jobs" tab 311. By selecting this tab, the candidate will open a new window within the candidate's "home page" which will allow the candidate to use a searching/filtering device reference FIG. 5 located within the embodiment of the present apparatus intended to search for specific employer/company profiles stored within this invention, by entering specific data into pre-generated fields within the search/filtering device reference FIG. 5 according to the embodiment of this invention.

Also within the candidate's "home page" the candidate will have access to online technical assessments 312 (a tab located within the candidate's "home page") linking the candidate to a technical assessment web site), self background checks 313 (a tab located within the candidate's "homepage" which will link the candidate to a personal background checking companies website), lastly but not limited to employment products 314 (a tab located within the candidate's "home page" which will open a new window within this invention providing the candidate with products such as a webcam or any device that may transmit IP based video/audio data allowing the candidate to communicate with employers/company profiles via this invention), according to the embodiment of this invention.

Figure 5:
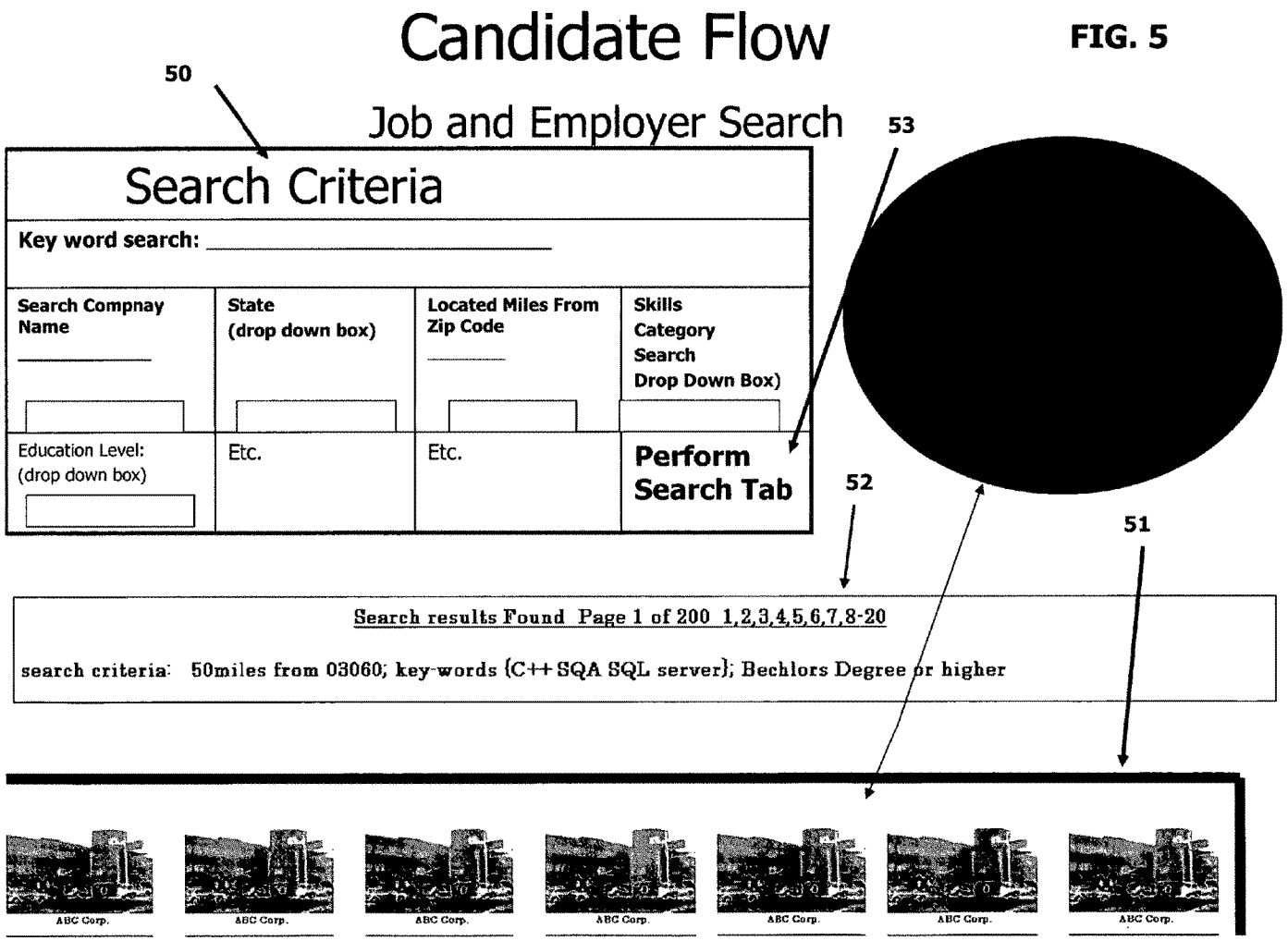
FIG. 5 is an example of a display screen generated by a computer running software which illustrates the search filtering device located within the candidate's home page (FIG. 4). This search filtering device will allow the candidate to search for employer profiles with attached jobs matching that match the specified search criteria entered into the search/filtering device as a part of the manual process presented in FIG. according to the embodiment of this invention.

FIG. 5 is an illustrative example of the "employer/company profile search/filtering device" located within the candidate's "home page" reference FIG. 4. Within the "employer/company profile search device" the candidate will be able to insert specific data into pre-generated fields 50 and choose pre-generated data to search from within pre-generated fields included within the search/filtering device according to the embodiment of this invention. Once the candidate performs the search by selecting the "Perform Search" tab 53, the candidate will be able to review how many employer/company profiles were found 52 from the previously entered search criteria within the pre-generated fields 50. Within the same screen/window the candidate will be able to view and select any of the requested and filtered employer/company profiles 51 with attached jobs according to the embodiment of this invention.

FIG. 6 is an illustrated example of the candidate's view of an employer/company's profile. While viewing the employer/company's "main profile page", the candidate will be able to view the company's personal data 60, such data as: address, contact information, contact person, and positions available, according to the embodiment of this invention. The candidate will be able to view a picture 61 of the company's facility or any other pertinent pictures 61, a brief description about the company 68 and a snapshot of available job positions posted by the company 67 according to the embodiment of this invention. Also the candidate may view and click on such tabs as "view all available jobs" 62, "Save as Potential Employer" 63, "Send Email" 64, "Block This Profile" 65 and "View Location and Contact Information" 66 according to the embodiment of this invention.

Within the "View All Available Jobs" tab 62, the candidate may open a new window within the employer/company's profile visually displaying all available jobs posted by the employer. Within the "Save as Potential Employer" 63, the candidate may save the employer/company's profile to the candidate's profile as part of the organization function of this invention according to the embodiment of this invention. At any time the candidate may click on the "Send Email" tab 64, which will open a window within the employer/company's "home page" allowing the candidate to send a direct email intended to communicate directly to the employer/company.

The candidate will also have a unique built in tool, the "Block This Profile" tab 65. By activating the "Block This Profile" tab 65, the candidate will be able to keep the selected employer/company from viewing the candidate's personal profile, reference FIG. 4. Lastly, the candidate will be able to click on the "View Location and Contact Information" tab 66 which will open a new window within the employer/company's profile visually presenting the employer/company's personal contact information if available according to the embodiment of this invention.

FIG. 7 is an illustrative example of the candidate sending the employer/company profile an email, intended to communicate directly with the employer according to the embodiment of the presentation.

Figure 8:
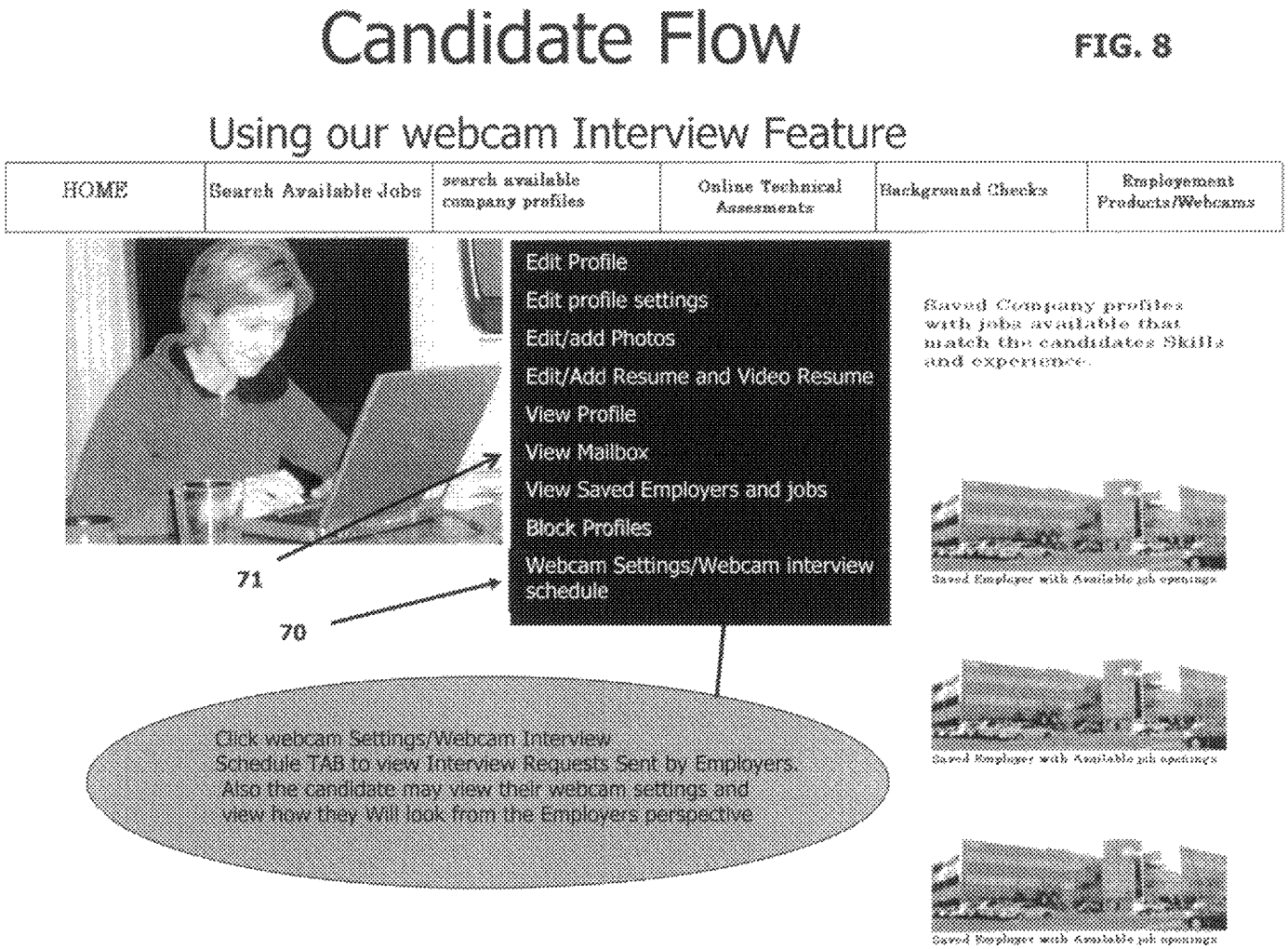
FIG. 8 is an example of a display screen generated by a computer running software which illustrates the Video pre-hire interview request notification sent to the candidate by the employer which shows an indicator within the candidate's home page as a part of the manual process presented in FIG. 3 according to the embodiment of this invention.
Figure 9:
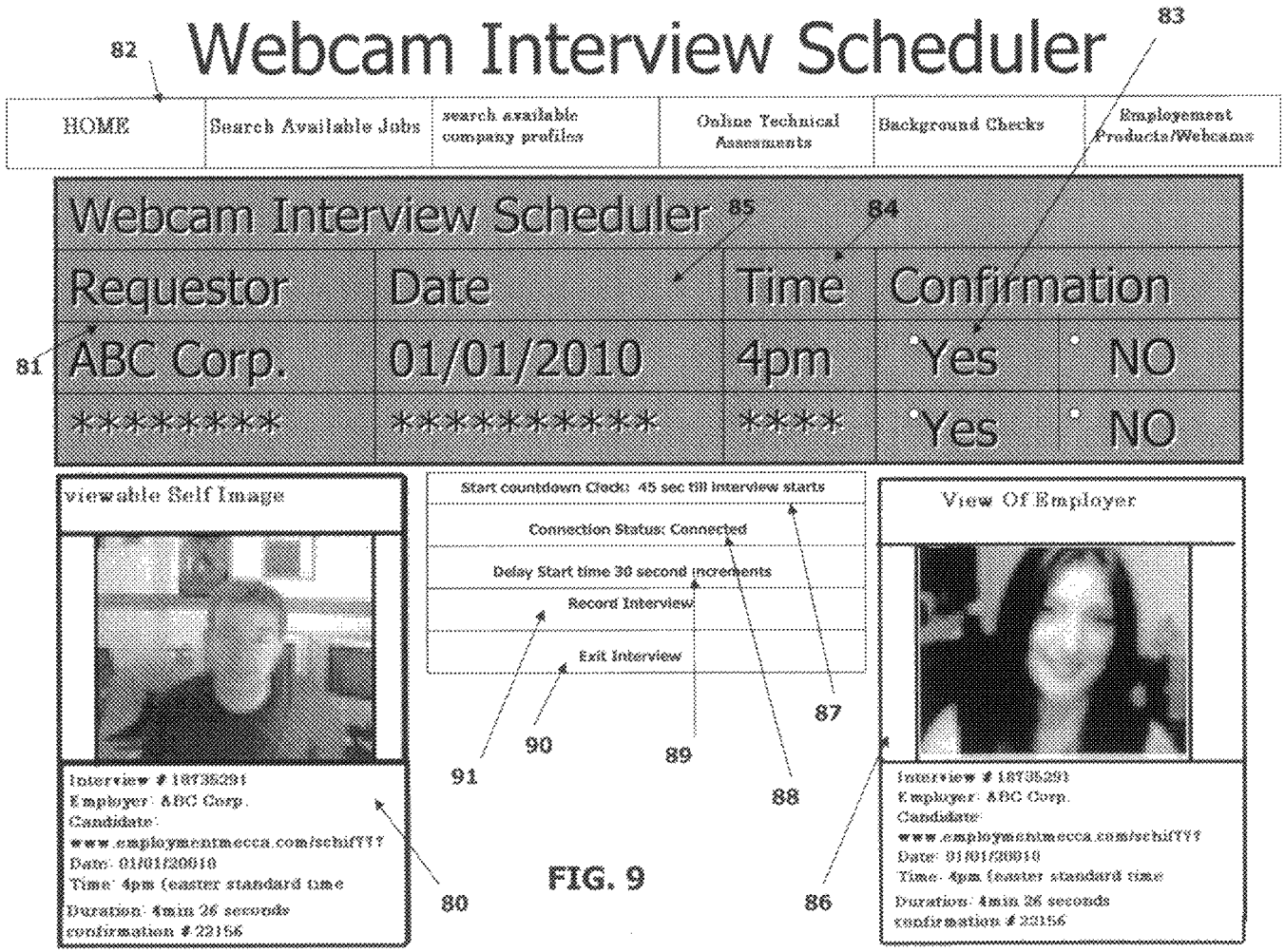
FIG. 9 is an example of a display screen generated by a computer running software which illustrates the Video pre-hire interview request device located within the candidate's home page. Here the candidate will be able to view any requests from an employer. Once a request is sent the candidate may activate the IP based video/audio webcam interview by accepting or confirming the request. Once the request is confirmed, a clock will appear in the middle counting down the time until the online webcam interview will automatically initiate unless either the candidate or employer edits the online webcam interview time. Here the candidate will not only be able to view themselves but they will also be able to view and communicate with the employer once the IP based streaming video interview initiates as a part of the manual process presented in FIG. 3 according to the embodiment of this invention.

FIG. 8 is an illustrative example of the candidates "home page" after an employer/company profile sends the candidate a request for an IP based Video/audio web interview, reference FIG. 9. After an employer/company profile sends an IP based video/audio web interview request the candidate will have an indicator that will illuminate in a red icon saying New Request 70. The candidate will be able to view and accept/deny the request within their personal "webcam settings/Webcam Interview Schedule" 70 located within the candidate's "home page" and within a reminder electronic mail message automatically sent to the candidate confirming the Web Interview request according to the embodiment of this invention.

FIG. 9 is an illustrative example of the Candidates "Webcam Interview Scheduling Device." The Web Interview and Scheduling Device is the key component of this invention. The Webcam Interview scheduler is a screen generated by a remote computer running software which is accessible by both candidates and employers which may log-in to this invention remotely via a computer or (company computer) connected and able to communicate with the web, intended to simultaneously links both the Candidate's profile with the Employer/Company's profile allowing both parties to send and receive IP based streaming video and audio data (created by a "webcam" or any device with the ability to capture and output-transmit the captured streaming video and audio data for the purpose of immediate communicating between two parties encompassed equipment connected via the Internet and this invention) according to the embodiment of the invention. The candidate may access their own webcam interview scheduler linked to and located within the candidate's personalized "home page."

The Webcam Interview Scheduler will allow the candidate to view such things as; the employer/company 81 requesting the streaming video/audio interview, the date 85 requested for the streaming video/audio interview, the exact time 84 requested for the streaming video/audio interview, confirmation buttons 83, (confirming the streaming video/audio interview with the employer/company profile) according to the embodiment of the invention. Most importantly the Webcam Interview Scheduler will allow the candidate to view their own transmitting image 80 (for self adjustment purposes) and view an image 86 of the employer during the IP based streaming video/audio web interview.

Also, there are such amenities as: a countdown start clock 87, connection status alert 88 (displaying if the candidate is properly connected), delay start time button 89 (allowing a candidate to extend the start time in 30 second increments), a record interview button 91 (allowing candidates to record and save the interview for further review), and lastly but not limited to an exit Interview button 90 (allowing the candidate to end the interview at anytime), all according to the embodiment of this invention.

Figure 10:
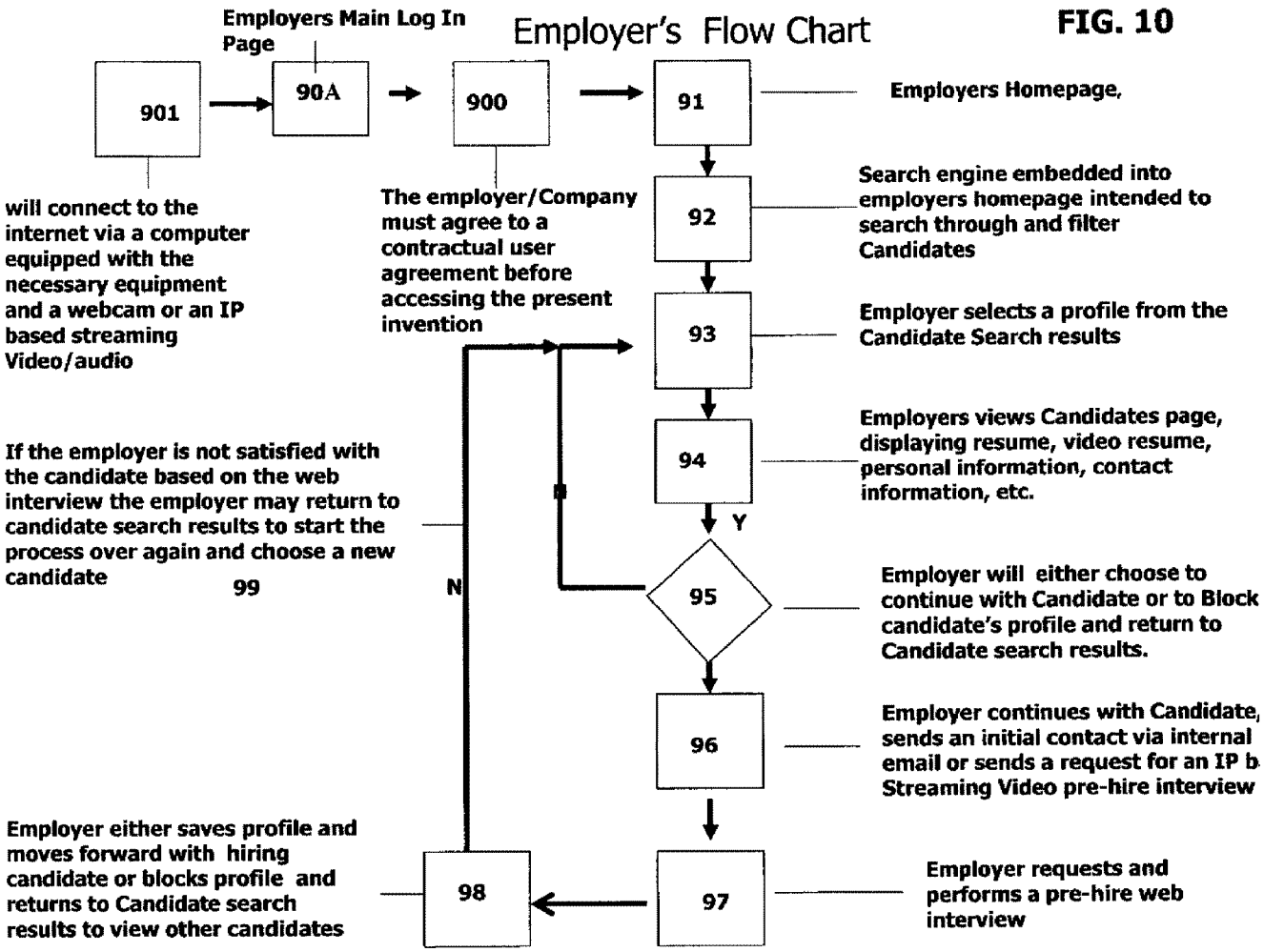
FIG. 10 is a flow chart showing the method in which an employer (end user) will successfully establish relationships with candidates according to the embodiment of this invention.

FIG. 10 is a flowchart illustrating an example of the operations performed by an employer/company intended to create a successful relationship with a candidate hereinafter according to the embodiment of this invention. The employer/company may use any personal computer or (company computer) with the ability to connect to the "web" or World Wide Web. By connecting the candidate's computer to the web, the candidate may access the "log-in page" 90A of the apparatus. The log-in page 90A allows the employer/company to access this invention remotely by running computer software according to the embodiment of this invention. The employer/company may either log in or create a new account via a "log-in" screen on the log-in page 90A.

Before the employer/company creates a new secure personal account, they must agree to a contractual agreement 900 issued by the provider of this invention. Once the employer accepts the contractual agreement 900 the employer will begin to create a secure personal employer/company profile 91. First the employer/company will be prompted to enter personal and professional data required to establish a secure personal employer/company account 91 according to the embodiment of this invention. Within the secure personal employer/company account 91, the employer/company will have access to the candidate profile search and filtering device 92. Within the candidate profile searching and filtering device 92, the employer/company may enter particular data within pre-established data fields which will assist the employer/company by systematically reducing candidate profile's until the candidate search is final with the end results 93 according to the embodiment of this invention. Once the end results are met, the employer/company will be able to view the search results 93 derived from the employer's entered search criteria.

With the employer/company viewing the search results 93, the employer will be able to individually select any "candidate profile" 94, which will fully display the candidate's personal profile page, presenting that candidate's contact information, pictures, a brief description about the candidate, a word formatted resume, a video formatted resume and a direct email account attached to the selected candidate's profile as part of an internal email system 96 allowing the employer to make initial contact with the candidate according to the embodiment of this invention. The employer will have a decision making point 95 after reviewing the candidate profile 94 with attached resumes to either send an email to the candidate through the internal email system and save the candidate profile for future consideration or return back to the candidate profile search results 93.

The employer/company decides to proceed and pursue a relationship with the selected candidate profile and sends an email from the employer's profile account to the candidate's profile account 96. Once the employer sends a contact email and makes initial communication, the employer if interested in the candidate will request to perform an IP based streaming video/audio webcam interview 97. If the candidate accepts the request for a webcam/streaming video and audio web interview 97, both the employer and candidate will participate in the streaming video/audio interview. After the interview both the candidate and employer may determine if a successful relationship was developed and either move forward with the hiring process 98, or the employer must take the return path 99 returning back to the candidate profile search results 93 to start over again all according the embodiment of this invention.

Figure 11:
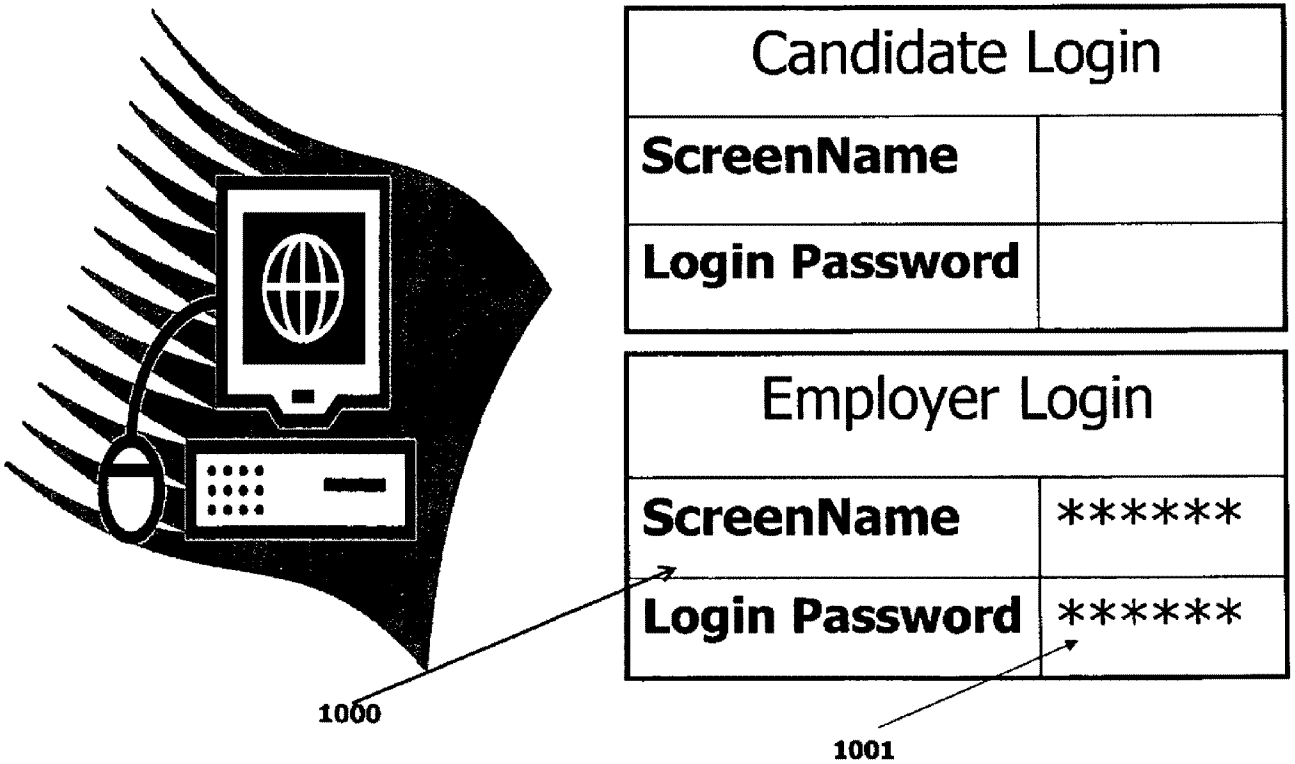
FIG. 11 is an example of a "log-in" display screen generated by a computer running software which illustrates the initial step for an employer to use the apparatus, a part of the manual process presented in FIG. 10 according to the embodiment of this invention.

FIG. 11 is an example illustration of the main "log-in" page where either a candidate or an employer/company may sign in. If this is the first time that the employer/company accesses the invention, they will be required to agree to a set contractual agreement issued by the provider of the present invention. Once the Employer accepts the contractual agreement the employer will begin to create a secure personal employer/company profile. Once the employer begins to create a new employer/company account which will bring the candidate or employer/company to enter a new blank profile with pre-generated fields where the candidate may enter their own personal information which will be searchable by the counter-users (i.e. the candidate is able to search for companies and companies are able to search for candidates or other companies register and are permissible to be using this invention). Once an account is created, the employer/company will be able to enter a self generated username 1000 and enter a self generated password 1001 which will allow the employer/company to access the present invention remotely from any computer connected and able to communicate with the "web" or World Wide Web according to the embodiment of this invention.

Figure 12:
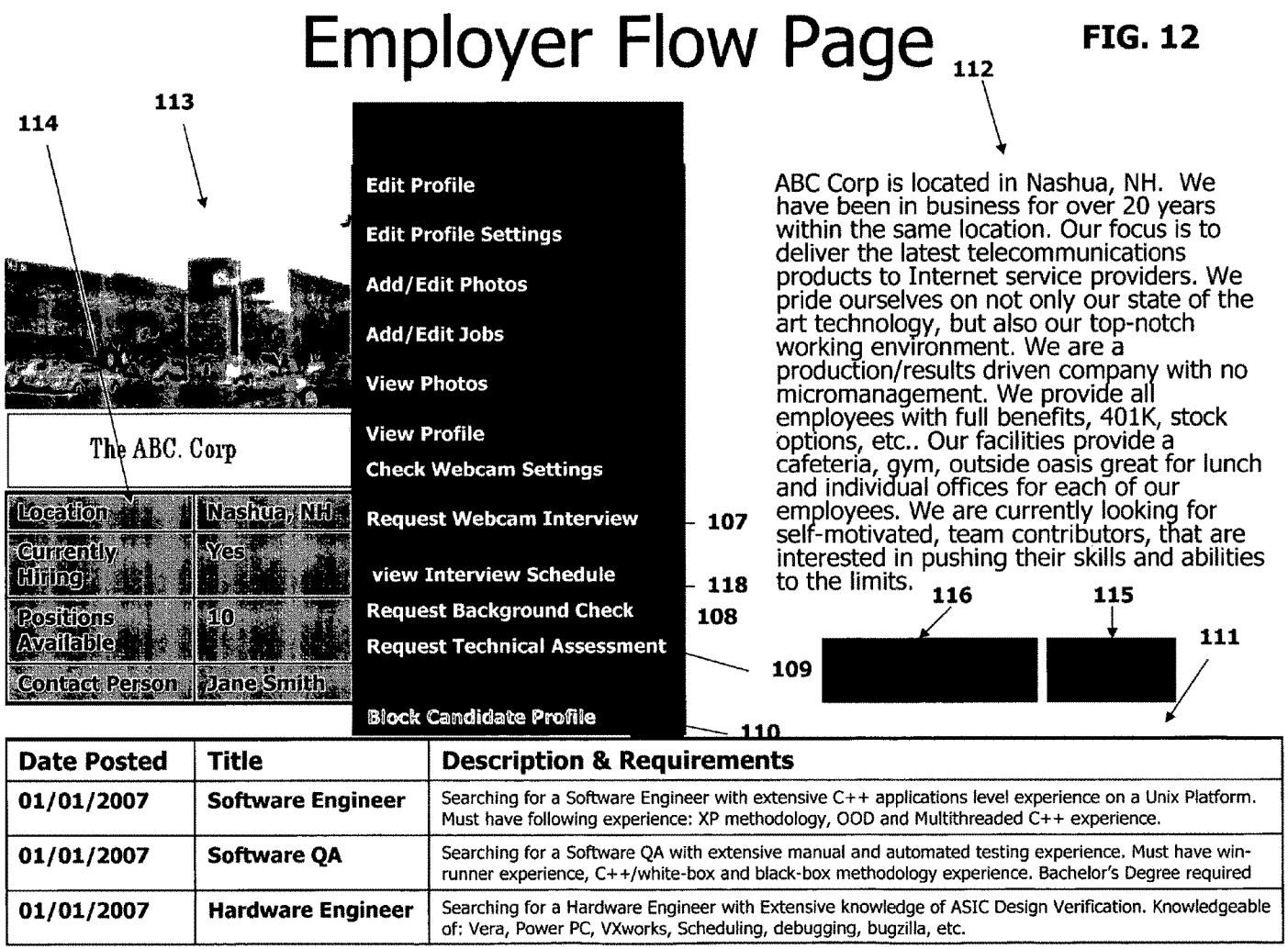
FIG. 12 is an example of a display screen generated by a computer running software which illustrates the employer's home page. This is where the employer will be able to securely login to access their own self generated account which will be stored within the infrastructure of this invention. It is here where the employer will be able to upload their personal/professional data, save potential candidate profiles, upload contact information and post available jobs as a part of the manual process presented in FIG. 10 according to the embodiment of this invention.

FIG. 12 is an example illustration of the employer/company's "Home Page." From this section of the present invention, the employer will be able to enter all necessary personal data (i.e. direct contact information, location/address, available jobs, a company description, etc.) which will be openly searchable by "candidate profiles" registered to use the present invention. First, from the employer's "home page", the employer will be able to edit their profile, updating their company name, address, contact information, etc. according to the embodiment of the present invention. Second, the employer/company will be able to edit their profile settings from their "home page." The employer will select the edit profile tab located within the employer's "home page" which will allow the employer to add and change features to their "home page" such as security settings, change passwords and usernames, change the profile to private making the profile inactive if there are no employment opportunities available, at any given time, etc. all according to the embodiment of the present invention. Third, the employer/company will have an add/edit photos tab located within the employer's "home page". The employer will click on this tab which will open a new window or section within the employer's "home page" giving the employer/company an option to upload any company facility or staff pictures which will be saved and maintained on a remote computer and infrastructure according to the embodiment of this invention.

Fourth, the employer/company will be able to add/edit their available jobs posted within the employer's "home page" by clicking on the Add/edit jobs tab. Once the employer clicks on the add/edit jobs tab, a window within the employer's "home page" will open, which will allow the employer to input/change their available jobs, job titles, descriptions of any jobs, and locations of each available job position, and information like this according to the embodiment of this invention.

Fifth, the employer/company will be able to view their posted pictures within the employer's "home page" by clicking on the view photos tab. Once the employer clicks on the view uploaded photos tab, a window within the employer's "home page" will open, which will allow the employer to view what the pictures will look like to a candidate viewing their page according to the embodiment of this invention.

Sixth, the employer/company will be able to view their personal profile/"home page" by clicking on a View Profile tab. This view will enable to employer/company to view their own profile in the same format as the candidate profile will view it. This way the employer will be capable of visually noticing any errors or things they would like to change about their profile, according to the embodiment of this invention.

Seventh, the employer/company will have a mailbox 115 where the employer/company will be able to send and receive emails directly to other active candidate profiles located within the present invention. The employer/company will click on the tab located in their "home page" which will open a new mailbox window allowing the employer/company to save emails, view sent emails and view received emails, etc. according to the embodiment of this invention.

Eighth, the employer/company will be able to view all saved candidate profiles 116 by selecting the "view saved employers/Companies tab 116. By selecting this tab it will open a new window showing every candidate that has been viewed and saved intended for organization according to the embodiment of this invention.

Ninth, the employer/company may send a request for an IP based streaming video/audio web interview to any selected candidate by clicking on the "Request Webcam Interview" tab 107. By selecting this tab, a new window will open within the employer/company "home page" where the employer/company will be able to enter the candidate requested to participate in a webcam IP based streaming video/audio interview, enter a requested date and time and enter in any specific directions or notes intended for the candidate to view. After all data is entered into the Interview scheduler, the employer/company will press a send button initializing the request according to the embodiment of this invention.

Tenth, the employer/company will be able to requests to any selected candidate to perform a criminal background check by clicking on the "Request Background check" tab 108 and a technical assessment test by clicking on the "Request technical assessment" tab 109. Both the "Request A Technical Assessment" tab 109 and the "Request A Background check" tab 108 will link the requester and requested to a third-party company which provides a proper resource to complete the two tasks according to the embodiment of this invention.

Eleventh, the employer/company will be able to block any candidate profiles as necessary by selecting the Block Profiles tab 110. By selecting the "Block Candidate profiles" tab 110, the employer will never have to be bothered by unqualified candidates, over persistent candidates, or unwanted candidates, etc. They will simply select the Block Profiles tab 110 located within the employer's "home page", which will allow the employer/company to perform a candidate profile search. Once the employer/company selects the intended profile, the employer/company will be prompted to Block the selected profile which will disable the selected candidate or another employer/company's profile from being able to view the employer's personal profile according to the embodiment of this invention.

Twelfth, the employer/company will be able to view their webcam Interview schedule and requests sent to candidate profiles by selecting the "webcam Settings/Webcam interview" tab 118. When the employer/company clicks this tab, a new window will open up within the employer's "home page" enabling the employer/company to view their personal "Web video Interview Scheduler", reference FIG. 13. Within the Scheduler the employer/company may view and edit any web IP based streaming video/audio requests previously sent to any candidate. Also within the "view Interview Schedule, the employer/company may view the receiving profile, the date of the interview, the time of the scheduled interview, how they will look from the candidate's profile, delay the web video/audio start time, etc. all according to the embodiment of this invention.

Lastly, but not limited to, the employer/company will be able to search available candidate profiles with attached video or word formatted resumes, by clicking a "Search Available candidates" tab. By selecting this tab, the employer/company will open a new window within the employer's "home page" which will allow the employer/company to use a searching/filtering device reference FIG. 13 located within the embodiment of this invention, apparatus intended to search for specific employers/company profiles stored within this invention, by entering specific data into pre-generated fields within the search/filtering device, reference FIG. 13 all according to the embodiment of this invention.

Figure 13:
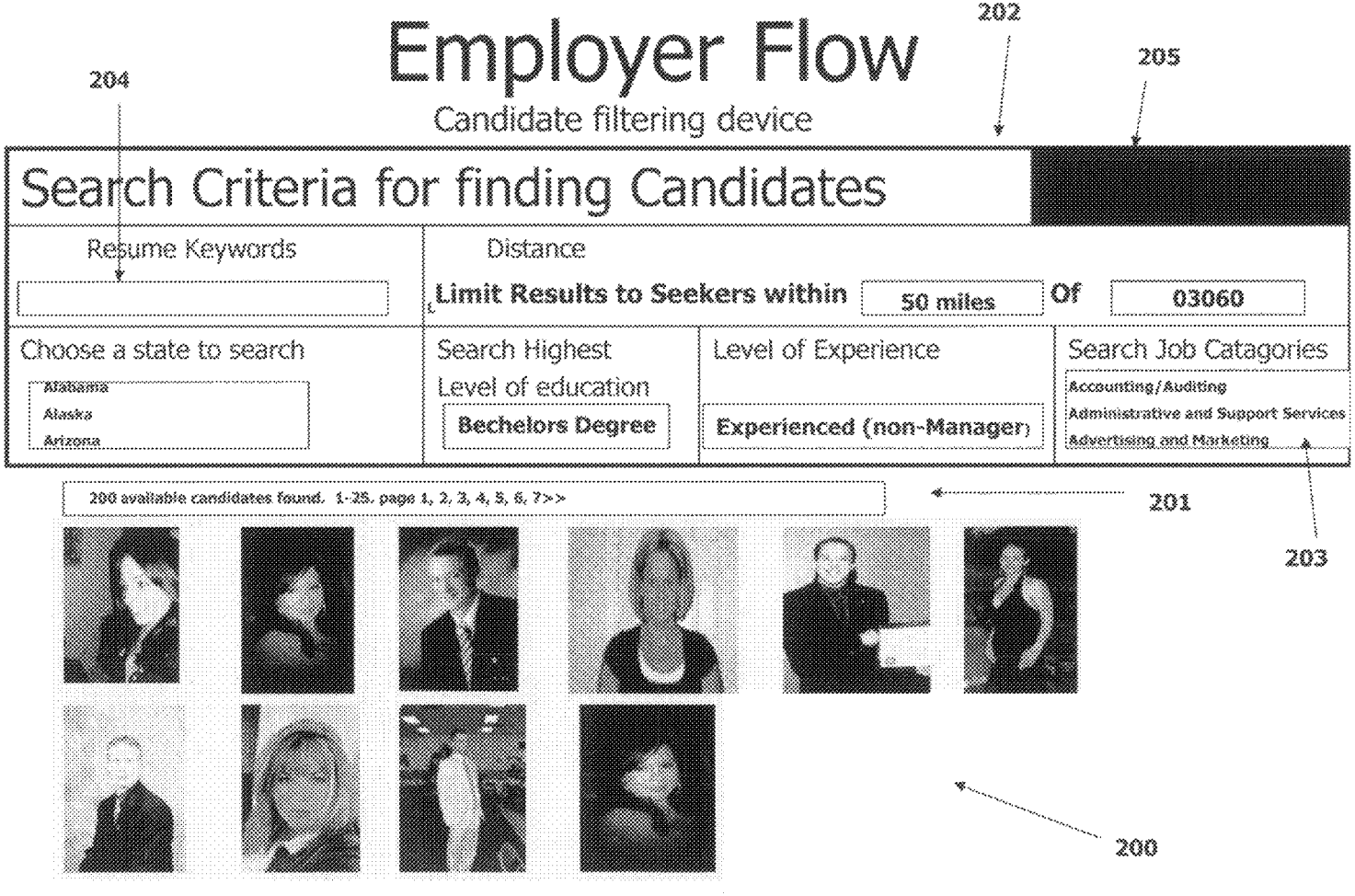
FIG. 13 is an example of a display screen generated by a computer running software which illustrates the search filtering device located within the employer's home page (FIG. 12). This search filtering device will allow the employer to search for candidate profiles with attached resumes and professional data that matches the specified search criteria entered into the search/filtering device as a part of the manual process presented in FIG. 10 according to the embodiment of this invention.

FIG. 13 is an illustrative example of the "candidate profile search/filtering device" located within the employer's "home page" reference FIG. 12. Within the "candidate profile search device" the candidate will be able to insert specific data into pre-generated fields 204 and choose pre-generated/established data 203 to search from within pre-generated fields 204 included within the search/filtering device 202 according to the embodiment of this invention. Once the employer performs the search by selecting the "Perform Search tab" 205, the candidate will be able to review how many candidate or other company/employer profiles were found 201 from the previously entered search criteria 202. Within the same screen/window the employer/company will be able to view and select any of the requested and filtered candidate profiles with attached resumes and personal/professional data, all according to the embodiment of this invention.

Figure 14:
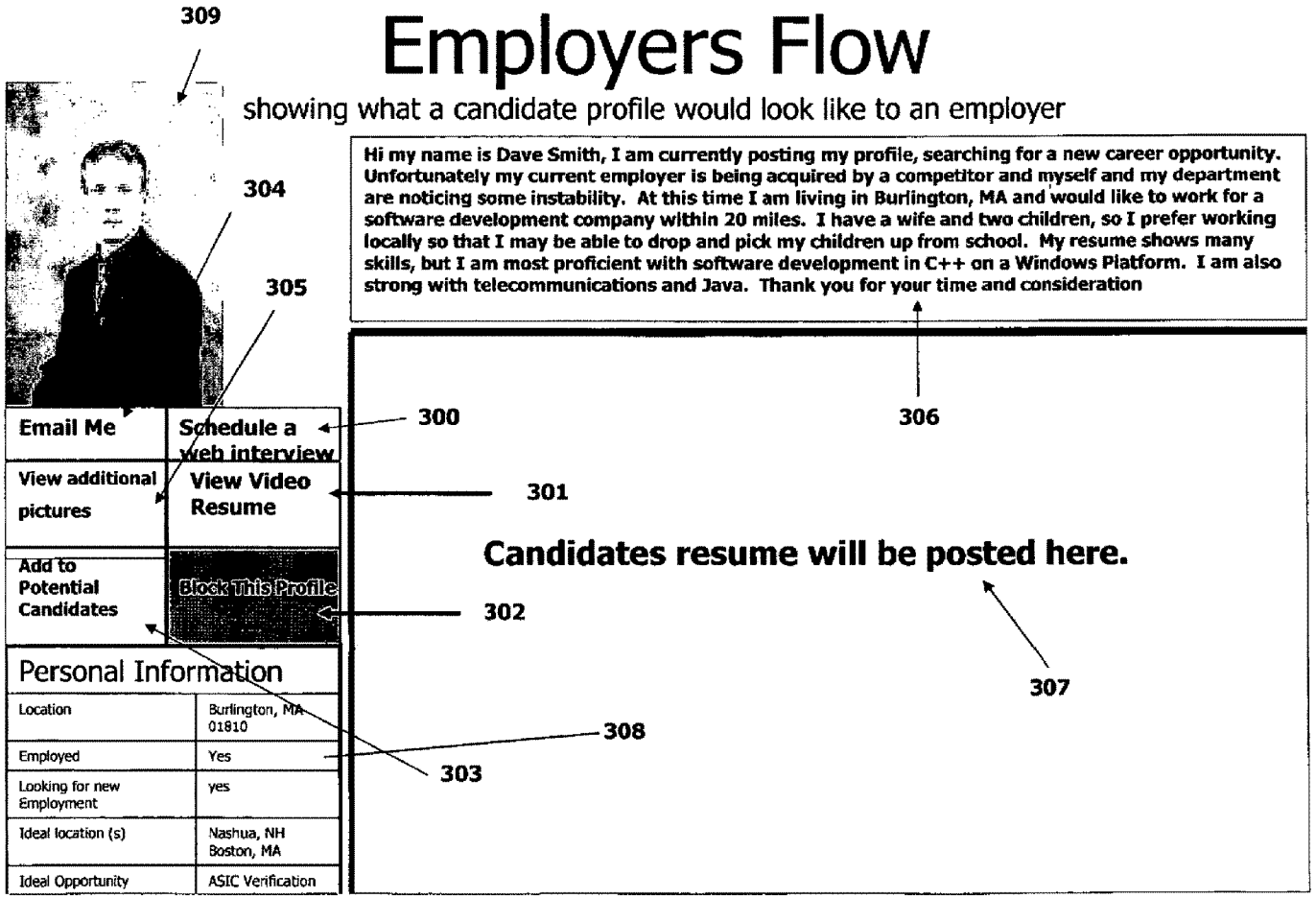
FIG. 14 is an example of a display screen generated by a computer running software which illustrates the employer's view of a candidate's home page as a part of the manual process presented in FIG. 10. It is here the employer will be able to view the candidate's personal information such as a picture, location, availability, contact information, a brief description about the candidate, a video resume and an internal email address to contact the candidate according to the embodiment of this invention.

FIG. 14 is an illustrative example of the employer/company viewing a candidate's "home page." While viewing the candidate's "home page", the employer/company will be able to view such things as; a word formatted resume 307, a brief description talking about the candidate 306, a picture(s) 309, personal contact information 308, and other functions according to the embodiment of this invention. Also while viewing the candidate's "home page", the employer/company may perform such functions as email the candidate 304, Schedule a video-web interview 300, view additional pictures posted by the candidate 305, save the candidate's profile to the employer/company's profile 303, view the candidate's video resume 301, reference FIG. 15, and lastly but not limited to, they employer may block the candidate from viewing the employer's profile "home page" 302.

Figure 15:
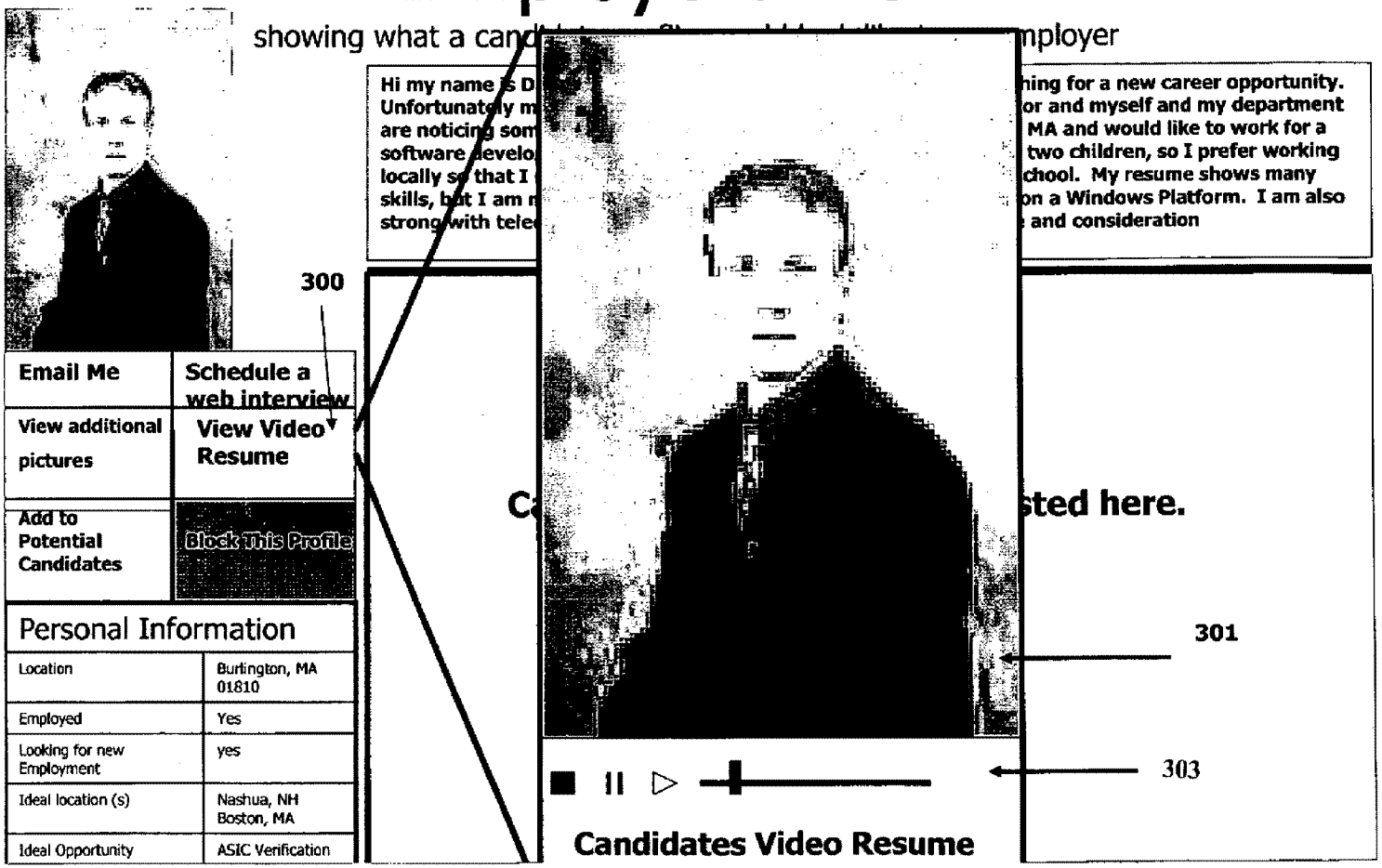
FIG. 15 is an example of a display screen generated by a computer running software which illustrates the video resume feature located within the candidate's home page. This will allow the employer to view the candidate and their communication skills prior to actually performing a web interview according to the embodiment of this invention.

FIG. 15 is an illustrated example of the employer/company viewing a candidates "video resume." When viewing the candidate's "home page", the employer/company may click on the "view video resume" tab 301, which will open a new window, presenting a stored video resume 301 uploaded into this invention by the candidate. Once the employer is able to view the resume they have such functions as stop, play and pause 303 all according to the embodiment of this invention.

Figure 16:
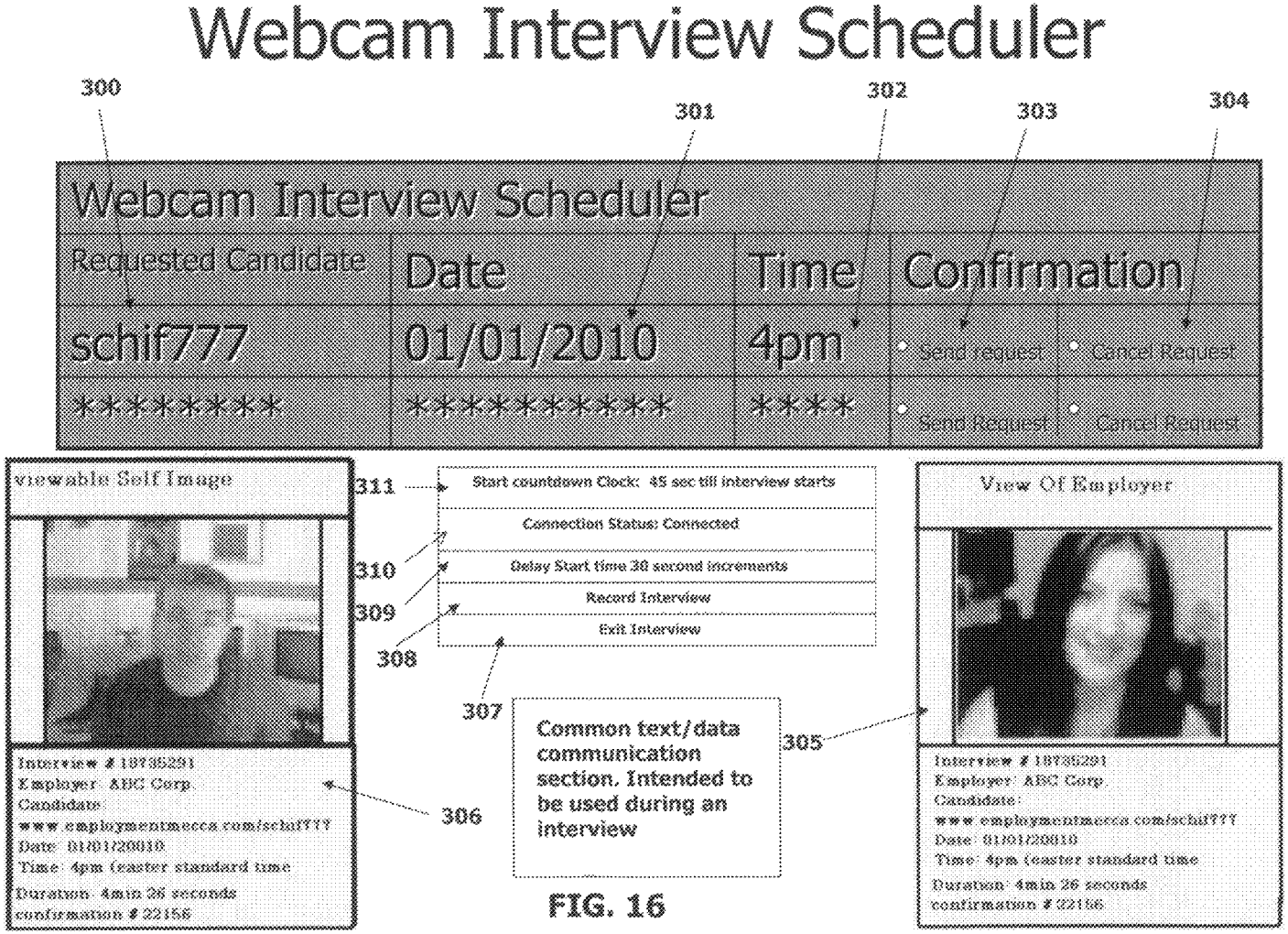
FIG. 16 is an example of a display screen generated by a computer running software which illustrates the video pre-hire interview request device located within the employer's home page. Here the employer has the ability to send requests for an IP based video/audio webcam online interview. Once a request is sent the candidate may activate the IP based video/audio webcam (streaming media video/audio device) interview by accepting or confirming the request. Once the request is confirmed, a clock will appear in the middle counting down the time until the online webcam interview will automatically initiate unless either the candidate or employer edits the online webcam interview time. Here the employer will not only be able to view themselves but they will also be able to view and communicate with the candidate once the IP based streaming video interview initiates as a part of the manual process presented in FIG. 10 according to the embodiment of this invention.

FIG. 16 is an illustrated example of the employer/company "Webcam Interview Scheduling Device." The Webcam Interview scheduler is a screen generated by a remote computer running software which is accessible by both candidates and employers which may log-into this invention remotely via a computer or (company computer) connected and able to communicate with the Web, intended to simultaneously links both the Candidate's profile with the Employer/Company's profile allowing both parties to send and receive IP based streaming video and audio data (created by a "webcam" or any device with the ability to capture and output-transmit the captured streaming video and audio data for the purpose of immediate communicating between two parties encompassed equipment connected via the internet and this invention) according to the embodiment of the invention. The employer may access their own webcam interview scheduler linked to and located within the employer/company's personalized "home page."

The Webcam Interview Scheduler will allow the employer/company to view such things as; any previously requested web streaming video/audio interviews with candidates 300, the dates 301 requested for the streaming video/audio interview, the exact time 302 requested for the streaming video/audio interview, a "send request buttons" 303, (sending a request seeking confirmation from the candidate profile for the invitation to the streaming video/audio interview), "Cancel Request" button 304, according to the embodiment of this invention. Most importantly the Webcam Interview Scheduler will allow the employer/company to view their own transmitting image 305 (for self adjustment purposes) and view the candidate 306 during the IP based streaming video/audio web interview according to the embodiment of this invention.

Also, there are such amenities as: a countdown start clock 311, connection status alert 310 (displaying if the employer/company is properly connected), delay start time button 309 (allowing a employer/company to extend the start time in 30 second increments), a record interview button 308 (allowing employer/company to record and save the interview for further review), and lastly but not limited to an exit Interview button 307 (allowing the employer/company to end the interview at anytime), all according to the embodiment of this invention.

I claim:

1. An interactive computerized [apparatus] *system,* comprising:

a first interface in communication with a computer network;

a second interface in communication with the computer network and remotely located from the first interface;

a server in communication with the computer network, *the server configured to provide the first interface to a first user via the computer network, the server configured to provide the second interface to a second user via the computer network,* the server having at least a first database [and a second database, wherein the first database stores] *storing* data relating to [a] *the* first user at the first interface*, the second user having access to the first database;*

[and the] *a* second database [stores] *storing* data relating to [a] *the* second user at the second interface, the first user having access to the second database [and the second user having access to the first database], wherein the second user posts information about at least one employment opportunity within the second database; [and]

an Internet Protocol (IP) based video and voice over IP (VoIP) interaction system housed on the server and having a quantity of programmable code executable on the server, the programmable code having instructions for interaction between the first user at first interface and the second user at the second interface, wherein the interaction includes the first user accessing the second database, the second user accessing the first database, facilitating communication between the first user and the second user by simultaneously linking a plurality of video signals and a plurality of VoIP signals, wherein the first *user* and second [users] *user* communicate contemporaneously via the IP based video and VoIP interaction system*; and*

*a home page stored within at least one of the first database or the second database and accessible by at least one of the first user or the second user via the computer network, the home page having an interview schedule section allowing* (*i*) *at least one of the first user or the second user to request a virtual interview with the other of the first user or the second user,* (*ii*) *the other of the first user or the second user to accept the request of the virtual interview, and* (*iii*) *a connection status display allowing the first user to see that the first user is connected to the IP based video and VoIP interaction system before the virtual interview begins.*

2. The interactive computerized [apparatus] *system* of claim 1, wherein*:*

[the first user's access to] *the first database is accessible to the second user such that the second user can view the first database; and* the second database [and the second user's access to the first database consists of viewing one of] *is accessible to the first user such that the first user can view the* the second [and first] database[, respectively].

3. The interactive computerized [apparatus] *system* of claim 1, wherein*:*

[the first and second users communicating contemporaneously via the IP based video and VoIP interaction system includes an IP based video and VoIP application within] the first *interface includes a first IP based video and VoIP application;* and

*the* second [interfaces] *interface includes a second IP based video and VoIP application.*

4. The interactive computerized [apparatus] *system* of claim 3, wherein the *first* IP based video and VoIP application [includes] *and the second IP based video and VoIP application are each configured to receive video and audio from* at least one video and audio capable input camera with the ability to capture a quantity of video and audio data.

5. The interactive computerized [apparatus] *system* of claim 3, wherein the *first* IP based video and VoIP application *and the second IP based video and VoIP application each* includes a input/output transmitting device with the ability to [output-] transmit a captured quantity of video and audio data, wherein the captured quantity of video and audio data may be contemporaneously communicated between the first user and the second user over the computer network.

6. The interactive computerized [apparatus] *system* of claim 1, wherein the *programmable code has instructions for facilitating an* interaction between the first user and the second user [includes] *in which* at least one of (*i*) the first user [accessing] *accesses* the second database [and] *while the first user contemporaneously communicates with the second user via the IP based video and VoIP interaction system or* (*ii*) the second user [accessing] *accesses* the first database while the first user contemporaneously communicates with the second user via the IP based video and VoIP interaction system.

7. The interactive computerized [apparatus] *system* of claim 1, further comprising a notification element housed at least partially on the server and accessible to at least one of the first user [and] *or* the second user, wherein when one of the first user [and] *or the* second user requests an interaction with the other of the first user [and] *or the* second user, the notification element sends a notification to the other of the first user [and] *or the* second user.

8. The interactive computerized [apparatus] *system* of claim 1, [further comprising a home page at least partially adapted by one of the first user and the second user, the homepage stored within one of the first database and the second database and accessible by one of the first user and the second user via the computer network, respectively, the home page having an] *wherein the* interview schedule section [allowing one of the first user and the second user to request a virtual interview with the other of the first user and the second user, wherein the interview schedule section generates] *of the homepage is configured to generate* a screen having an interview scheduler display section [allowing] *that allows at least* one of the first user [and] *or* the second user to view at least one of: *a profile of the other of* the first *user* or second user [that requested an interview, the], *a* date of the interview [and the], *or a* time of the interview.

9. The interactive computerized [apparatus] *system* of claim 1, [further comprising a home page at least partially adapted by one of the first user and the second user, the homepage stored within one of the first database and the second database and accessible by one of the first user and the second user via the computer network, respectively, the home page having an] *wherein the* interview schedule section [allowing one of the first user and the second user to request a virtual interview with the other of the first user and the second user, wherein the interview schedule section further comprises a scheduling tool allowing] *of the homepage is configured to allow* at least one of the first [and] *user or the* second [users] *user* to schedule a start time for the virtual interview.

[10. The interactive computerized apparatus of claim 1, further comprising a home page at least partially adapted by one of the first user and the second user, the homepage stored within one of the first database and the second database and accessible by one of the first user and the second user via the computer network, respectively, the home page having an interview schedule section allowing one of the first user and the second user to request a virtual interview with the other of the first user and the second user, wherein the interview schedule section generates a screen having a interview scheduler display section allowing one of the first user and second user to view a start time of the interview.]

11. The interactive computerized [apparatus] *system* of claim 1, [further comprising a home page at least partially adapted by one of the first user and the second user, the homepage stored within one of the first database and the second database and accessible by one of the first user and the second user via the computer network, respectively, the home page having an] *wherein the* interview schedule section [allowing one of the first user and the second user to request a virtual interview with the other of the first user and the second user, wherein the interview schedule section generates] *of the homepage is configured to generate* a screen having [a] *an* interview countdown display incrementally counting down to a start time of the virtual interview.

[12. The interactive computerized apparatus of claim 1, further comprising a home page at least partially adapted by one of the first user and the second user, the homepage stored within one of the first database and the second database and accessible by one of the first user and the second user via the computer network, respectively, the home page having a connection status display allowing the first user and the second to see when they are connected to the other on the IP based video and VoIP interaction system.]

13. The interactive computerized [apparatus] *system* of claim 1, [further comprising a home page at least partially adapted by one of the first user and the second user, the homepage stored within one of the first database and the second database and accessible by one of the first user and the second user via the computer network, respectively, the home page having an] *wherein the* interview schedule section [allowing one of the first user and the second user to request a virtual interview with the other of the first user and the second user, wherein the request for the virtual interview is accepted by the other of the first user and the second user, wherein] *of the homepage is configured to allow* at least one of the first user [and] *or the* second user [is able] to exit the virtual interview and re-enter the virtual interview within a predetermined period of time.

14. The interactive computerized [apparatus] *system* of claim 1, wherein *the server is configured to allow* at least one of (*i*) the first user [and] *to access at least a portion of user data of the second user stored in the second database or* (*ii*) *the* second user *to* accesses *at least a portion of* user data of [the other of] the first user [and second user, wherein accessing the user data occurs] *stored in the first database* after a start time of the virtual interview and prior to an end time of the virtual interview[, wherein the user data is at least a portion of at least one of the data relating to a first user stored in the first database and data relating to a second user stored in the second database].

15. The interactive computerized [apparatus] *system* of claim 1, [further comprising a home page at least partially adapted by one of the first user and the second user, the homepage stored within one of the first database and the second database and accessible by one of the first user and the second user via the computer network, respectively,] *wherein* the home page [having] *includes* a record interview section allowing *at least one of* the first user [and] *or* the second user to record *the virtual interview* and save [a previously held] *at least a portion of the virtual* interview.

16. The interactive computerized [apparatus] *system* of claim 15, wherein*:*

*the second user is from a plurality of second users;*

*at least the portion of* the recorded [and saved] interview *is saved in the first database* and [video resume are] *is* accessible to [a] *the* plurality of second users[, wherein]*; and*

*the first database is configured such that* the plurality of second users can access [the recorded and saved] *at least the portion of the virtual* interview and *a* video resume by [at least one of] conducting a search for the [recorded and saved] *virtual* interview [and video resume and viewing a post of the recorded and saved interview and video resume on a plurality of second interfaces associated with the plurality of second users, respectively, wherein the post of the recorded and saved interview and video resume is created by the first user].

17. The interactive computerized [apparatus] *system* of claim 1, [further comprising] *wherein* at least one of a textual resume [and] *or* a video resume *is* stored within the first database, the at least one textual resume and video resume uploaded to the first database by the first user, wherein *the first database is accessible to* the second user [downloads] *such that the second user can download* at least one of the textual resume [and] *or* the video resume.

18. A method for contemporaneous interaction between at least a first user and a second user on an interactive computerized apparatus, the method comprising the steps of:

providing a first interface [and] *to the first user at a first interface;*

*providing* a second interface *to the second user, the first interface and the second interface* in communication with a computer network, the second interface remotely located from the first interface;

hosting at least a first database and a second database within a server in communication with the computer network;

storing data relating to the first user *that is* at the first interface within the first database and storing data relating to the second user *that is* at the second interface within the second database, wherein the first user [accesses to] *can access* the second database and the second user [accesses to] *can access* the first database;

posting information about at least one employment opportunity by the second user within the second database; and facilitating interaction between the first user at first interface and the second user at the second interface with a programmable code executable on the server, wherein the interaction includes:

accessing the second database by the first user;

accessing the first database by the second user; *and* facilitating communication between the first user and the second user [by] *via a web interface, including* simultaneously linking a plurality of video signals and a plurality of *voice over Internet Protocol* (VoIP) signals with an Internet Protocol (IP) based video and [voice over IP (]VoIP[)] interaction system[; and] *such that the first user and the second user can communicate* contemporaneously [communicating with the second user by the first user] via the *IP* based video and VoIP interaction system, *the web interface including an interview schedule section allowing (i) at least one of the first user or the second user to request a virtual interview with the other of the first user or the second user, (ii) the other of the first user or the second user to accept the request of the virtual interview, and (iii) a connection status display allowing the second user to see that the second user is connected to the IP based video and VoIP interaction system before the virtual interview begins*.

19. The method [for contemporaneous interaction between at least a first user and a second user on an interactive computerized apparatus] of claim 18, further comprising [the step of] setting up an IP based video and VoIP interview between the first user and the second user, including [the steps of]:

sending a request from one of the first user [and] *or* the second user to the other of the first user [and] *or* the second user for the IP based video and VoIP interview;

receiving a response about the request for the IP based video and VoIP interview; and scheduling a time for the IP based video and VoIP interview.

20. A computerized program *stored on a non-transitory medium* having programmable code executable on a computerized server, the computerized program *having the programmable code* comprising instructions [causing] *which, when executed by the computerized server, cause* the computerized server to:

*adapt a first interface from a plurality of interfaces to correspond to a first user from a plurality of users;*

*adapt a second interface from a plurality of interfaces to correspond to a second user from the plurality of users;* provide [a] *the* plurality of interfaces *to the plurality of users such that each interface from the plurality of interfaces is* accessible to a *user from the* plurality of users[, the plurality of interfaces accessible through] *via* a computerized device;

[adapt at least two of the plurality of interfaces to correspond to at least two of the plurality of users, respectively, wherein]

*store* a quantity of user data [is added to each of the at least two interfaces by the at least two users, respectively] *added to the first interface by the first user*;

*store a quantity of user data added to the second interface by the second user;* facilitate a communication between the [at least two users by] *first user and the second user via the first interface and the second interface, the first interface having an interview schedule section that includes a connection status display allowing the first user to see that the first user is connected to an Internet Protocol (IP) based video and voice over Internet Protocol (VoIP) interaction system before a virtual interview begins;* synchronizing a plurality of video signals and a plurality of [voice over Internet Protocol (]VoIP[)] signals with an [Internet Protocol (]IP[)] based video and VoIP interaction system, wherein the plurality of video signals and the plurality of VoIP signals are exchanged contemporaneously between the [at least two users] *first user and the second user during the virtual interview*; and graphically display and audibly present the plurality of video signals and the plurality of VoIP signals to [each of the at least two users] *the first user and the second user* contemporaneously, *via a web interface* wherein [the at least two users] *the first user and the second user* can access the quantity of data added to each of the [at least two interfaces] *first interface and the second interface* while the plurality of video signals and the plurality of VoIP signals are graphically displayed and audibly presented.

*21. The computerized program stored on the non-transitory medium of claim 20, wherein the instruction to adapt the second interface includes instructions which, when executed by the computerized server, cause the computerized server to:*

*adapt the second interface including a second interview schedule section, the interview schedule section of the first interface being a first interview schedule section, each of the first interview schedule section and the second interview schedule section allowing (i) at least one of the first user or the second user to request the virtual interview with the other of the first user or the second user and (ii) the other of the first user or the second user to accept the request of the virtual interview.*

*22. The computerized program stored on the non-transitory medium of claim 20, wherein the instruction to adapt the second interface includes instructions which, when executed by the computerized server, cause the computerized server to:*

*adapt the second interface including a second connection status display allowing the second user to see that the second user is connected to the IP based video and VoIP interaction system before the virtual interview begins, the connection status display of the first interface being a first connection status display.*

*23. The computerized program stored on the non-transitory medium of claim 20, wherein the instruction to adapt the second interface includes instructions which, when executed by the computerized server, cause the computerized server to:*

*adapt the second interface including a second interview schedule section, the interview schedule section of the first interface being a first interview schedule section, each of the first interview schedule section and the second interview schedule is configured to generate a screen having an interview scheduler display section that allows at least one of the first user or the second user to view at least one of: a profile of the other of the first user or second user, a date of the interview, or a time of the interview.*

*24. The computerized program stored on the non-transitory medium of claim 20, the computerized program having programmable code further comprising instructions which, when executed by the computerized server, cause the computerized server to:*

*allow at least one of (i) the first user to access at least a portion of the quantity of data added to the second interface by the second user or (ii) the second user to access at least a portion of the quantity of data added to the first user interface by the first user after a start time of the virtual interview and prior to an end time of the virtual interview.*

*25. The computerized program stored on the non-transitory medium of claim 20, the computerized program having*

*programmable code further comprising instructions which, when executed by the computerized server, cause the computerized server to:*

*allow at least one of the first user or the second user to record the virtual interview and save at least a portion of the virtual interview.*

* * * * *